(12) United States Patent
Murahashi et al.

(10) Patent No.: US 10,037,594 B2
(45) Date of Patent: Jul. 31, 2018

(54) RESOLUTION ESTIMATING DEVICE

(71) Applicant: Sharp Kabushiki Kaisha, Osaka-shi, Osaka (JP)

(72) Inventors: Yoshimitsu Murahashi, Osaka (JP); Masaaki Moriya, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 130 days.

(21) Appl. No.: 15/035,337

(22) PCT Filed: Dec. 2, 2014

(86) PCT No.: PCT/JP2014/081858
§ 371 (c)(1),
(2) Date: May 9, 2016

(87) PCT Pub. No.: WO2015/098436
PCT Pub. Date: Jul. 2, 2015

(65) Prior Publication Data
US 2016/0292819 A1    Oct. 6, 2016

(30) Foreign Application Priority Data

Dec. 27, 2013   (JP) ................. 2013-271621

(51) Int. Cl.
*G06T 3/40*    (2006.01)
*G06T 7/42*    (2017.01)

(52) U.S. Cl.
CPC ........... *G06T 3/4007* (2013.01); *G06T 7/42* (2017.01); *G06T 2207/10004* (2013.01); *G06T 2207/20004* (2013.01)

(58) Field of Classification Search
None
See application file for complete search history.

(56) References Cited

U.S. PATENT DOCUMENTS

| | | | |
|---|---|---|---|
| 6,504,533 B1 | 1/2003 | Murayama et al. | |
| 6,707,954 B1 * | 3/2004 | Akamatsu | G06K 9/46 382/286 |

(Continued)

FOREIGN PATENT DOCUMENTS

JP    2000-305555 A    11/2000

*Primary Examiner* — Kim Vu
*Assistant Examiner* — Nathan Bloom
(74) *Attorney, Agent, or Firm* — Keating & Bennett, LLP

(57) ABSTRACT

A resolution estimating device is achieved which is capable of adequately estimating the resolution of the original image of any received image signal. A resolution estimating device (1000) includes a proximity-degree acquiring unit (1), an accumulation unit (2), a frequency transform unit (3), and a spectrum analyzing unit (4). The proximity-degree acquiring unit (1) acquires the proximity degree value of each target pixel. The accumulation unit (2) accumulates the proximity degrees of the target pixels, for example, in the vertical direction on the image, and obtains a one-dimensional data sequence of the accumulated proximity degree values. The frequency transform unit (3) performs a frequency transform on the one-dimensional data sequence of the accumulated proximity degree values obtained by the accumulation unit (2), and obtains a one-dimensional frequency-component data sequence which is a one-dimensional data sequence for frequency regions. The spectrum analyzing unit (4) detects periodicity, for example, in the horizontal direction on a proximity degree image on the basis of the one-dimensional frequency-component data sequence obtained by the frequency transform unit (3), and estimates the resolution of the original image, which is an image before a scaling-up process, of an input image on the basis of the detected periodicity.

7 Claims, 13 Drawing Sheets

(56) References Cited

U.S. PATENT DOCUMENTS

| | | | | |
|---|---|---|---|---|
| 6,823,089 B1* | 11/2004 | Yu | ................ | G06T 5/10 375/E7.19 |
| 2008/0063303 A1* | 3/2008 | Strom | ................ | G06T 3/4023 382/298 |
| 2009/0087119 A1* | 4/2009 | Dorrell | ................ | G06T 3/4007 382/264 |
| 2010/0316297 A1* | 12/2010 | Knee | ................ | G06T 7/0002 382/191 |
| 2016/0125266 A1* | 5/2016 | Fujiwara | ................ | G06T 7/001 382/215 |

\* cited by examiner

RESOLUTION ESTIMATING DEVICE

TECHNICAL FIELD

The present invention relates to image processing technology, and, for example, relates to a technique of, when a low-resolution image is scaled up to be displayed on a high-resolution display device, estimating the resolution of the image (original image) before the scaling-up process.

BACKGROUND ART

When a low-resolution image is to be displayed on a high-resolution display device, the low-resolution image (original image) is subjected to a scaling-up process, and the image having subjected to the scaling-up process is displayed on the high-resolution display device, enabling the low-resolution image (original image) to be displayed as a high-quality image. When a scaled-up image (an image having subjected to a scaling-up process) is to be subjected to a process for improving image quality, information about how much magnification has been used is necessary, and accuracy in estimation of this information affects the image quality.

Typically, when an image having SD (Standard Definition) quality is scaled up to an image (video) having HD (High Definition) quality in a display device such as a television set, the factor of scaling-up (hereinafter referred to as a "scaling-up factor") in the scaling-up process may be easily grasped because the resolution of the original image before the scaling-up process is already known.

However, for example, when a video or the like which has been scaled up by a broadcasting station is received, the number of pixels of the received image (video) is equal to the number of pixels for an HD image (HD video). Therefore, the magnification for the image (video) before a scaling-up process is not typically known. Therefore, in this case, it is necessary to estimate the scaling-up factor.

In a method of related art in which a scaling-up factor is estimated, an image signal is directly subjected to frequency analysis (for example, a Fourier transform), whereby high-frequency components included in the image signal are detected, and an approximate scaling-up factor is estimated on the basis of the amount of the detected high-frequency components.

For example, a technique disclosed in PTL 1 (Japanese Unexamined Patent Application Publication No. 2000-305555) enables the number of horizontal pixels of a video (image) to be estimated by using a horizontal synchronization signal and a vertical synchronization signal as key information. Therefore, the technique enables a scaling-up factor to be estimated.

SUMMARY OF INVENTION

Technical Problem

However, in the above-described method for estimating a scaling-up factor by using frequency analysis, accuracy in estimation of a scaling-up factor heavily depends on content to be displayed. Some scaling-up methods fails to achieve correct estimation of a scaling-up factor. For example, some scaling-up methods may cause the following case. When an image obtained by scaling up a low-resolution image is subjected to frequency analysis, folding components (alias components) may be distributed in high-frequency regions with high power. The folding components may be erroneously determined as high-frequency components, and an image to be processed may be erroneously determined to be a high-resolution image. In this case, in the method for estimating a scaling-up factor by directly performing frequency analysis on an image signal, a scaling-up factor fails to be correctly estimated.

In the technique described in PTL 1, when content (for example, a video received by a liquid-crystal display device of PTL 1) itself has been scaled up, the resolution of the original image, which is an image before the scaling-up process, of the content fails to be estimated.

Therefore, in view of the above-described problems, an object of the present invention is to achieve a resolution estimating device which enables the resolution of the original image (original video) of any received image signal (video signal) to be adequately estimated.

Solution to Problem

To solve the above-described issue, a first configuration is a resolution estimating device which estimates the resolution of the original image, which is an image before a scaling-up process, of an input image. The resolution estimating device includes a proximity-degree acquiring unit, an accumulation unit, a frequency transform unit, and a spectrum analyzing unit.

The proximity-degree acquiring unit sets an estimated proximity degree of each target pixel in such a manner that, as the pixel position of the target pixel is assumed to be closer to a pixel position at which a pixel in the original image is disposed when the original image is scaled up, the estimated proximity degree is set larger.

The accumulation unit accumulates the estimated proximity degrees of the target pixels in a second direction orthogonal to a first direction on the image, and obtains a one-dimensional data sequence of the accumulated estimated-proximity-degree values.

The frequency transform unit performs a frequency transform on the one-dimensional data sequence of the accumulated estimated-proximity-degree values obtained by the accumulation unit, and obtains a one-dimensional frequency-component data sequence which is a one-dimensional data sequence for frequency regions.

The spectrum analyzing unit detects periodicity in the first direction on an image of the estimated proximity degrees on the basis of the one-dimensional frequency-component data sequence obtained by the frequency transform unit, and estimates the resolution of the original image, which is an the image before the scaling-up process, of the input image on the basis of the detected periodicity.

The "estimated proximity degree" is an indicator indicating positional closeness of the pixel position of a target pixel on an image to a pixel position on an interpolation image obtained by performing an insertion process (interpolation) on the original image of an input image. A proximity degree is set, for example, as follows. A proximity degree is set larger as the pixel position of a target pixel on an image is closer to a pixel position on an interpolation image obtained from the original image.

That is, the "estimated proximity degree" is an indicator indicating how close a distance is in the coordinate space obtained after a scaling-up process. The distance is a distance between a pixel in an input image which is disposed in an insertion process and a target pixel in an image obtained after the scaling-up process.

Advantageous Effects of Invention

The present invention may achieve a resolution estimating device which may adequately estimate the resolution of the original image (original video) of any received image signal (video signal).

DESCRIPTION OF EMBODIMENTS

[First Embodiment]

Figure 1:
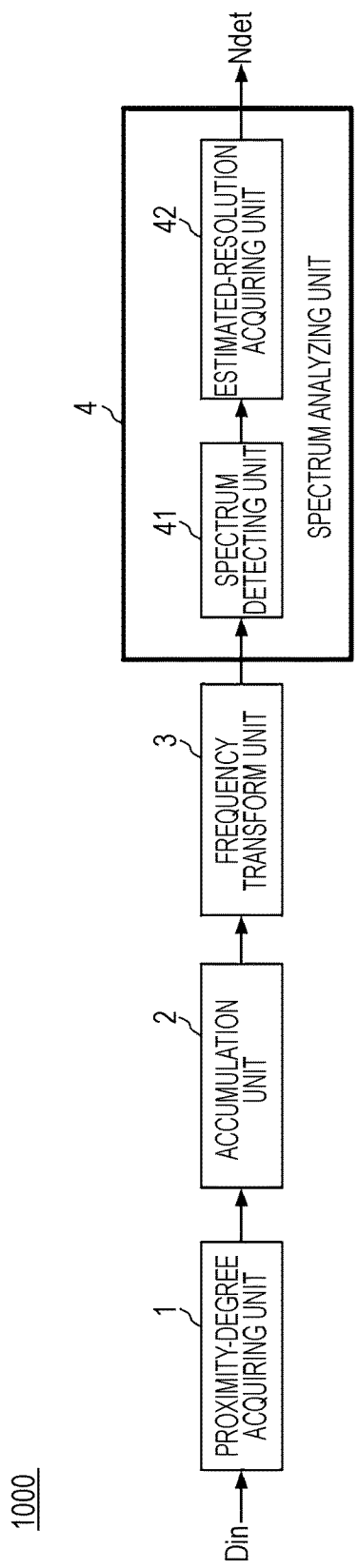
FIG. 1 is a schematic diagram of the configuration of a resolution estimating device 1000 according to a first embodiment.

A first embodiment will be described below by referring to the drawings.

In the first embodiment, an example will be described in which the horizontal resolution of an image (video) is estimated.

<1.1: Configuration of Resolution Estimating Device>

FIG. 1 is a schematic diagram of the configuration of a resolution estimating device 1000 according to the first embodiment.

Figure 2:
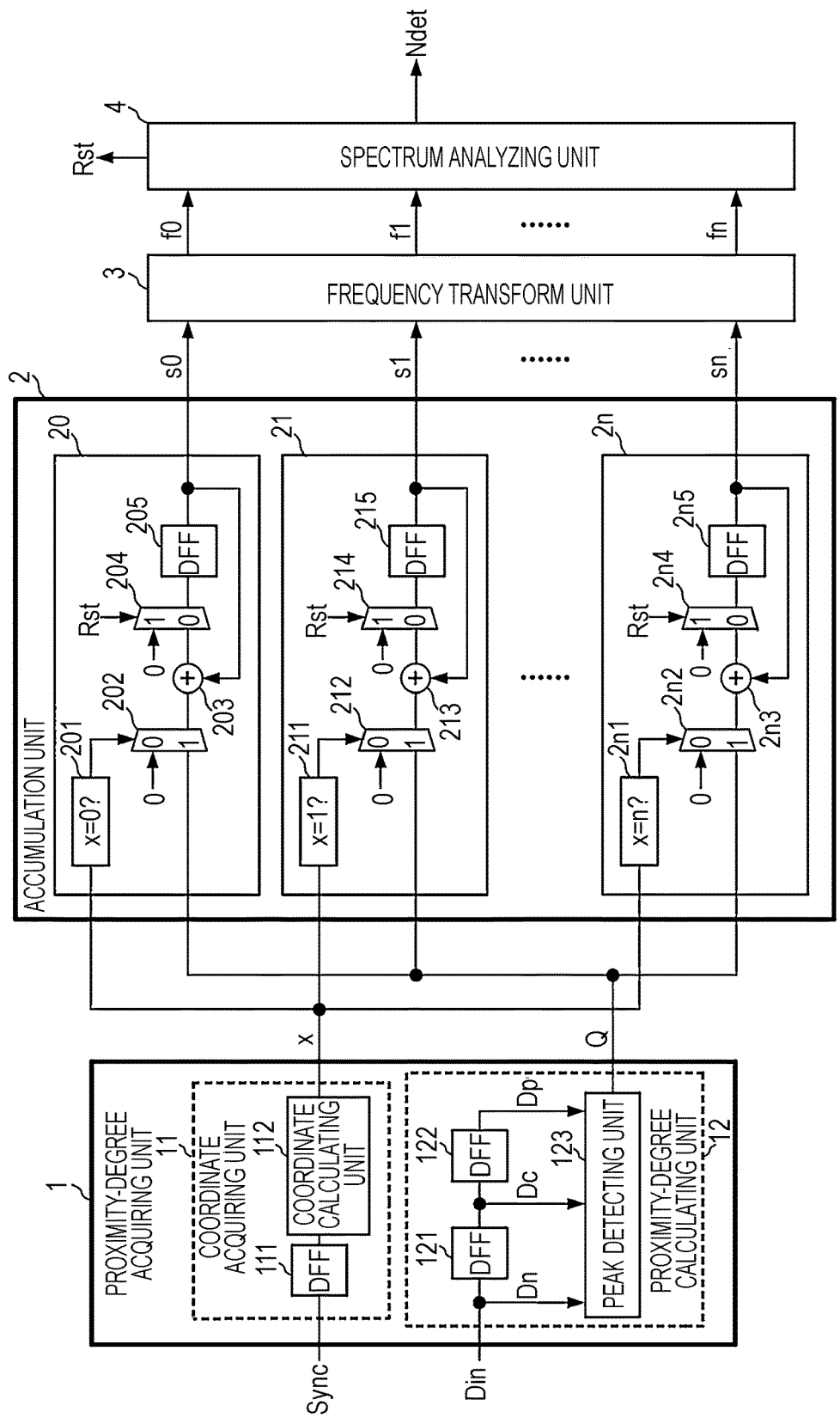
FIG. 2 is a schematic diagram of the configuration in which the resolution estimating device 1000 according to the first embodiment is configured with hardware.

FIG. 2 is a schematic diagram (example) of the configuration in which the resolution estimating device 1000 according to the first embodiment is configured with hardware.

As illustrated in FIG. 1, the resolution estimating device 1000 includes a proximity-degree acquiring unit 1, an accumulation unit 2, a frequency transform unit 3, and a spectrum analyzing unit 4.

The proximity-degree acquiring unit 1 which receives an input image (video) Din acquires the proximity degree (estimated proximity degree) of each target pixel (to-be-processed pixel) on the basis of the relationship between the pixel value of the target pixel and the pixel values of pixels adjacent to the target pixel. The proximity-degree acquiring unit 1 may receive the synchronization signal (the horizontal synchronization signal or the vertical synchronization signal) Sync of the input image (video) Din. In FIG. 2, the synchronization signal Sync is illustrated as the horizontal synchronization signal of the input image (video) Din.

The "proximity degree" (estimated proximity degree) is an indicator indicating how close to a pixel position on an image, which is an image before a scaling-up process, of the input image Din, the coordinate position of the target pixel on the input image Din is (see below for more details).

The proximity-degree acquiring unit 1 outputs a value (signal) indicating the acquired proximity degree to the accumulation unit 2.

For example, as illustrated in FIG. 2, the proximity-degree acquiring unit 1 includes a coordinate acquiring unit 11 and a proximity-degree calculating unit 12.

When the coordinate acquiring unit 11 is configured with hardware, as illustrated in FIG. 2, the coordinate acquiring unit 11 includes a D flip-flop 111 and a coordinate calculating unit 112.

The D flip-flop 111 which receives the synchronization signal Sync (for example, the horizontal synchronization signal, the vertical synchronization signal, or the enable signal) for the input image (video) Din delays the received synchronization signal Sync by one clock, and outputs the delayed synchronization signal Sync to the coordinate calculating unit 112.

The coordinate calculating unit 112 which receives the synchronization signal Sync which is output from the D flip-flop 111 calculates the horizontal coordinate x (the horizontal-direction coordinate x of the target pixel on the image formed by using the input image signal Din) of the signal that to be processed (the image signal corresponding to the target pixel), on the basis of the received synchronization signal Sync. The coordinate calculating unit 112 outputs the value of the calculated horizontal coordinate x to the accumulation unit 2.

When the proximity-degree calculating unit 12 is configured with hardware, as illustrated in FIG. 2, the proximity-degree calculating unit 12 includes D flip-flops 121 and 122 and a peak detecting unit 123.

The D flip-flop 121 which receives the input image (video) Din (image signal Din) delays the received image signal Din by one clock, and outputs the delayed image signal Din to the D flip-flop 122 and the peak detecting unit 123.

The D flip-flop 122 which receives the image signal which is output from the D flip-flop 121 delays the received image signal by one clock, and outputs the delayed image signal to the peak detecting unit 123.

The peak detecting unit 123 receives the input image (video) Din (image signal Din) (which is designated as an image signal (image data) Dn), the image signal (which is designated as an image signal (image data) Dc) which is output from the D flip-flop 121, and the image signal (which is designated as an image signal (image data) Dp) which is output from the D flip-flop 122. That is, the peak detecting unit 123 determines whether or not the image data Dc (target pixel) that is to be processed is a peak value (extreme value), by using three pieces of image data (pixels), i.e., the image data Dc that is to be processed, and the image data Dn and the image data Dp which are adjacent in the horizontal direction on the image to the pixel that corresponds to the image data Dc and that is located at the center. Then, the peak detecting unit 123 calculates the proximity degree Q on the basis of the determination result, and outputs data indicating the calculated proximity degree Q to the accumulation unit 2.

The accumulation unit 2 receives the value (signal) indicating the proximity degree that is output from the proximity-degree acquiring unit 1. The accumulation unit 2 accumulates the values indicating received proximity degrees (hereinafter referred to as "proximity degree values") for each horizontal coordinate defined on the two-dimensional image area of the input image Din (see below for more details). Then, the accumulation unit 2 outputs, to the frequency transform unit 3, the accumulated proximity degree value for each horizontal coordinate which is obtained through the above-described process.

When the accumulation unit 2 is configured with hardware, as illustrated in FIG. 2, the accumulation unit 2 includes accumulation processors, the number of which is n+1 (n: natural number), i.e., a first accumulation processor 20, a second accumulation processor 21, . . . , and a (n+1)th accumulation processor 2*n*.

As illustrated in FIG. 2, the first accumulation processor 20 includes a coordinate determining unit 201, a first selector 202, an adder 203, a second selector 204, and a D flip-flop 205.

The coordinate determining unit 201 receives the horizontal-coordinate value x which is output from the coordinate acquiring unit 11 of the proximity-degree acquiring unit 1. The coordinate determining unit 201, (1) when the received horizontal-coordinate value x is "0", outputs "1" to the first selector 202, and, (2) when the received horizontal-coordinate value x is not "0", outputs "0" to the first selector 202.

The first selector 202 receives the proximity degree value Q which is output from the proximity-degree calculating unit 12 of the proximity-degree acquiring unit 1, and also receives the value indicating the determination result which is output from the coordinate determining unit 201. The first selector 202, (1) when the value indicating the determination result which is output from the coordinate determining unit 201 is "1", outputs, to the adder 203, the proximity degree value Q which is output from the proximity-degree calculating unit 12, and, (2) when the value indicating the determination result which is output from the coordinate determining unit 201 is "0", outputs the value "0" to the adder 203.

The adder 203 which receives the output from the first selector 202 and the output from the D flip-flop 205 adds the outputs to each other. Then, the adder 203 outputs the value obtained through the adding, to the second selector 204.

The second selector 204 receives the output from the adder 203 and a reset signal Rst which is output from the spectrum analyzing unit 4. The second selector 204, (1) when the reset signal is "0", outputs, to the D flip-flop 205, the output from the adder 203, and, (2) when the reset signal is "1", outputs the value "0" to the D flip-flop 205.

The D flip-flop 205 delays the output from the second selector 204 by one clock, and outputs the delayed output as the accumulated value s0 to the frequency transform unit 3 and the adder 203.

As illustrated in FIG. 2, the second accumulation processor 21 to the (n+1)th accumulation processor 2*n* have a configuration similar to that of the first accumulation processor 20. Similarly to the first accumulation processor 20, the second accumulation processor 21 to the (n+1)th accumulation processor 2*n* output the accumulated values s1 to sn, respectively, to the frequency transform unit 3.

The frequency transform unit 3 receives the accumulated proximity degree values which are output from the accumulation unit 2. The frequency transform unit 3 uses the accumulated proximity degree values which are obtained from the accumulation unit 2 for each image (for example, for each frame image), as one data sequence (for example, data constituted by (n+1) values, i.e., the accumulated values s0 to sn in FIG. 2), and performs a frequency transform process (for example, a Fourier transform, a discrete Fourier transform, and a fast Fourier transform) on the one data sequence. Then, the frequency transform unit 3 obtains frequency spectral data (for example, data constituted by (n+1) values, i.e., frequency spectral values f0 to fn in FIG. 2) corresponding to the one data sequence. The frequency transform unit 3 outputs the obtained frequency spectral data to the spectrum analyzing unit 4.

As illustrated in FIG. 1, the spectrum analyzing unit 4 includes a spectrum detecting unit 41 and an estimated-resolution acquiring unit 42.

The spectrum detecting unit 41 receives the frequency spectral data which is output from the frequency transform unit 3. The spectrum detecting unit 41 analyzes the received frequency spectral data and outputs the analysis result to the estimated-resolution acquiring unit 42.

The estimated-resolution acquiring unit 42 estimates (determines) the resolution of the input image (video) Din which is a resolution before a scaling-up process, on the basis of the analysis result of the frequency spectral data which is output from the spectrum detecting unit 41. Then, the estimated-resolution acquiring unit 42 outputs the estimated (determined) resolution as an estimated resolution Ndet.

<1.2: Operations of Resolution Estimating Device>

Operations performed by the resolution estimating device 1000 having such a configuration will be described below.

An example will be described below in which the resolution estimating device 1000 is configured with hardware as illustrated in FIG. 2.

The input image (video) Din is received by the proximity-degree calculating unit 12 of the proximity-degree acquiring unit 1.

The proximity-degree calculating unit 12 calculates the proximity degree value Q from the received input image (video) Din. Specifically, the proximity-degree calculating unit 12 calculates the proximity degree value Q by using the following image data of three pixels which are continuous in the horizontal direction: (1) the image data Dc (the image data DC of the target pixel) which is output from the D flip-flop 121; (2) the image data Dp (the image data Dp which is output from the D flip-flop 122) which corresponds to a pixel adjacent to the target pixel on the left in the horizontal direction on the image formed by using the image signal Din (image data which is input one clock before the image data Dc); and (3) the image data Dn (=image data Din) which corresponds to a pixel adjacent to the target pixel on the right in the horizontal direction (image data which is input one clock after the image data Dc).

More specifically, either of the following methods, i.e., (method A) and (method B), is used to calculate a proximity degree value Q.

(METHOD A):

(A1) If the image data Dc is the maximum or minimum value among the image data Dn, Dc, and Dp of the three-pixels, the proximity-degree calculating unit 12 sets the proximity degree value Q as Q=1.

(A2) In cases other than the above-described (A1), the proximity-degree calculating unit 12 sets the proximity degree value Q as Q=0.

(METHOD B):

(B1) If the image data Dc is the maximum or minimum value among the image data Dn, Dc, and Dp of the three pixels, the proximity-degree calculating unit 12 sets the proximity degree value Q as Q=1.

(B2) If the image data Dc and the image data Dp are the maximum or minimum value among the image data Dn, Dc, and Dp of the three pixels, or if the image data Dc and the image data Dn are the maximum or minimum value, that is, if the image data Dc is the maximum or minimum value but one of the image data Dp and the image data Dn is equal to the image data Dc, the proximity-degree calculating unit 12 sets the proximity degree value Q as Q=0.5.

(B3) In cases other than (B1) or (B2) described above, the proximity-degree calculating unit 12 sets the proximity degree value Q as Q=0.

As described above, the proximity degree value Q calculated by the proximity-degree calculating unit 12 is output to the accumulation unit 2. In (B2) described above, Q may be a value satisfying 0<Q<1, and may be a value other than "0.5".

The reason why a proximity degree value Q is calculated as described above will be described by using FIGS. 3 to 5.

Figure 3:
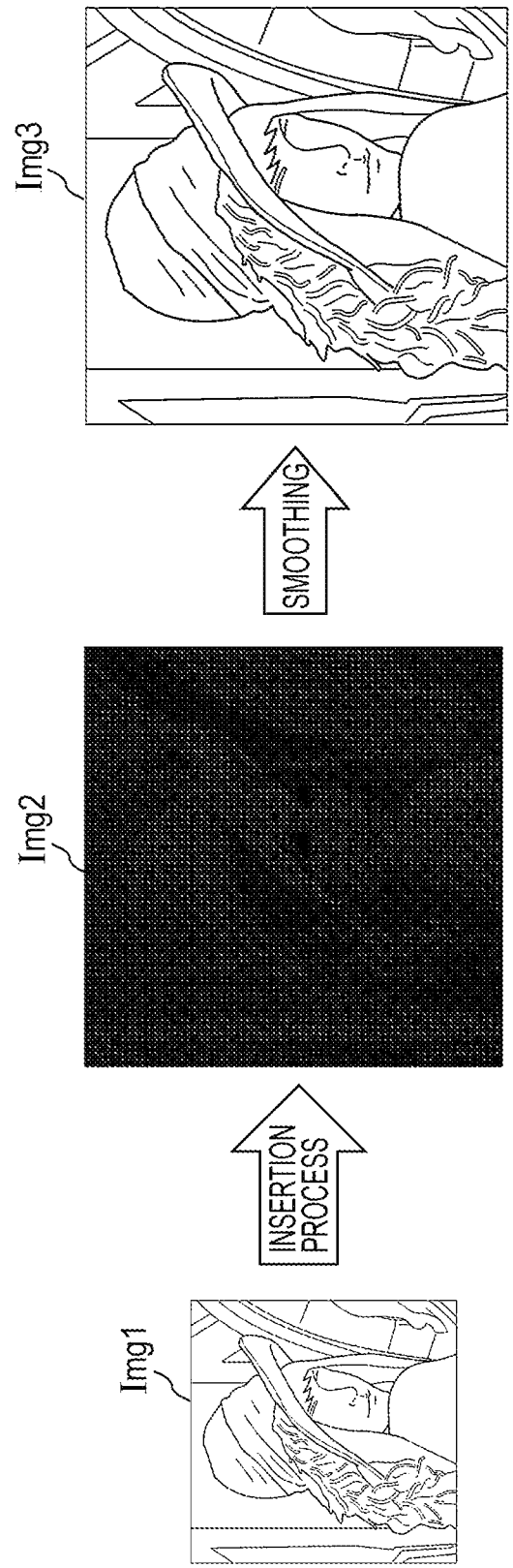
FIG. 3 is a diagram for describing a scaling-up process.

FIG. 3 is a diagram for describing a scaling-up process.

FIG. 3 schematically illustrates a case in which an original image Img1 of 64×64 pixels is scaled up in such a manner that both of the width and the height are quadrupled. That is, in addition to the original image Img1, FIG. 3 schematically illustrates an image Img2 obtained after an insertion process (interpolation process), and a scaled-up image (an image after the scaling-up process) Img3 obtained by smoothing the image Img2.

In the scaling-up process, typically, an original image is subjected to an insertion process (interpolation process) and then a smoothing process.

In the insertion process (interpolation process), as illustrated in FIG. 3, the pixel data of the original image Img1 of 64×64 pixels is enlarged so that the pixel data is located uniformly in a coordinates system of 256×256 pixels. In the image of 256×256 pixels after the enlargement, pixels whose pixel values are "0" are disposed at coordinates positions of pixels for which corresponding pixels are not present in the original image. Thus, the image Img2 which has been subjected to the interpolation process is obtained.

Then, the image Img2 which has been subjected to the insertion process (interpolation process) is subjected to a smoothing process. For example, in the smoothing process, a low-pass filtering process or the like is performed, and the pixels having a pixel value of "0" are complemented by using adequate values, whereby a natural scaled-up image may be obtained. Thus, the scaled-up image Img3 is obtained.

In the image which has been subjected to the scaling-up process, the pixels are set in a natural and smooth manner through interpolation. Therefore, in the related art, it has been difficult to estimate the resolution of original pixels from an image after the scaling-up process.

The image Img2 just after the interpolation process will be focused on. In this image, non-zero data (pixel data) of 64 pixels is present among the 256 pixels in the horizontal (vertical) direction. Therefore, it is found that the image (original image) before the scaling-up process is an image of 64×64 pixels, and that the scaling-up process has been performed by using a scaling-up factor of 4.

Therefore, to estimate the number of pixels of the original image from a scaled-up image, it is necessary to find out, in one way or another, the number of interpolated pixels (the number of pixels in the image just after the interpolation process).

The relationship between pixels which is produced when linear interpolation is used will be described by using FIG. 4.

Figure 4:
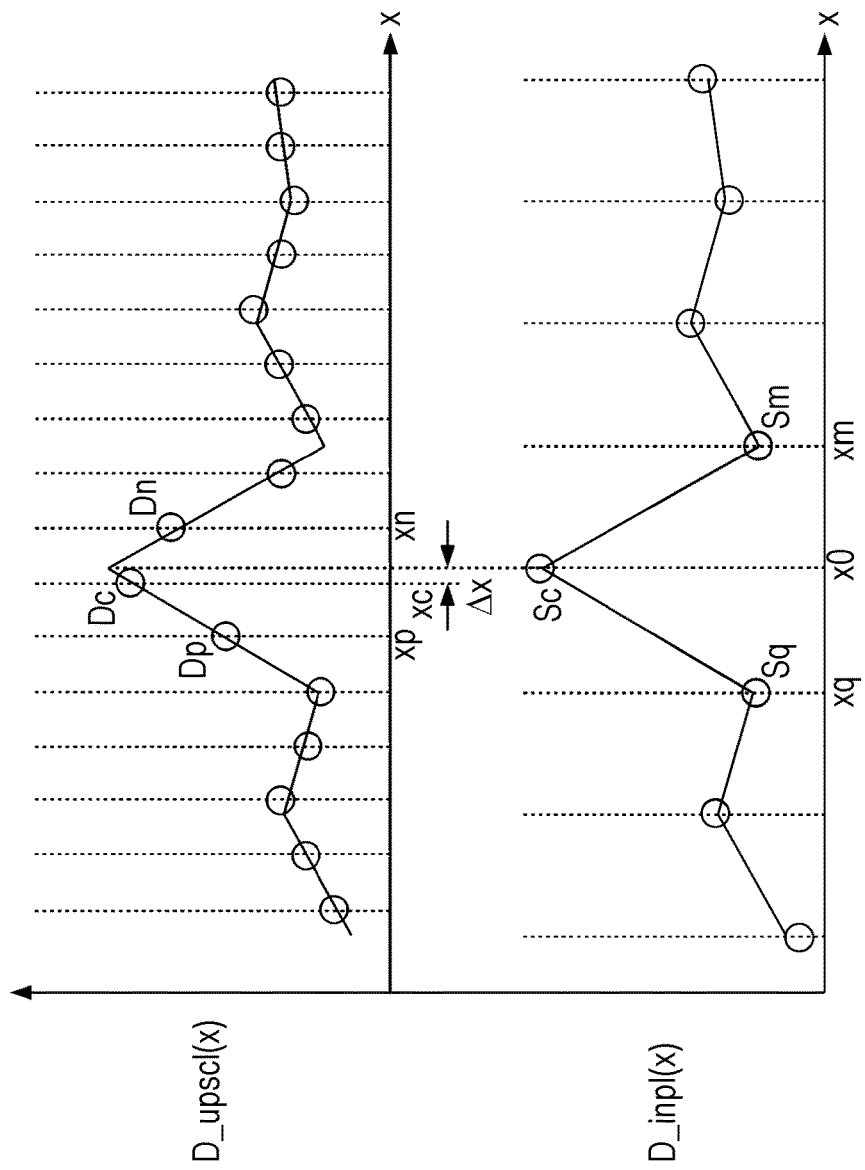
FIG. 4 is a diagram for describing the relationship between pixels which is formed when linear interpolation is used.

FIG. 4 is a diagram for describing the relationship between pixels which is produced when linear interpolation is used, and is a diagram illustrating an interpolation image D_inpl(x) and a scaled-up image D_upsl(x) for which the horizontal axes are matched each other. In FIG. 4, a white circle indicates a pixel.

Originally, image data is two-dimensional data. However, to simplify the description, a description will be made by using one-dimensional data. FIG. 4 illustrates the coordinate position x on the horizontal axis, and the pixel brightness (pixel value) on the vertical axis. The lower diagram in FIG. 4 is a diagram in which the original data (original image data) is displayed in the coordinates system used after the scaling-up process. That is, the lower diagram in FIG. 4 illustrates the image data D_inpl(x) (interpolation image D_inpl(x)) before the scaling-up process is performed. The upper diagram in FIG. 4 illustrates the image data D_upsl(x) (scaled-up image D_upsl(x)) after the scaling-up process.

A case will be described in which the scaling-up process using linear interpolation is performed on the image data in the lower diagram in FIG. 4.

For example, in the interpolation image D_inpl(x), a part in which the middle image data among three continuous pieces of image data is a peak value (extreme value) will be focused on. For example, three continuous pieces of image data illustrated in FIG. 4, i.e., image data Sq (image data at the position, x=xq), the image data Sc (image data at the position, x=x0), and the image data Sm (image data at the position, x=xm), will be focused on.

As seen from FIG. 4, the pixel in the scaled-up image D_upsl(x) which is located at the position closest to the pixel Sc having a peak value in the interpolation image D_inpl(x) is the pixel Dc (x=xc). The pixel Dc (image data at the position, x=xc) has a value larger than those of the pixel Dp (image data at the position, x=xp) and the pixel Dn (image data at the position, x=xn) which are adjacent to the pixel Dc. That is, it is found that the pixel Dc (image data at the position, x=xc) has a peak value (the maximum value among the three pixels).

When the scaling-up process is performed by using linear interpolation, the pixel Dp has approximately a value between the value of the pixel Sc and that of the pixel Sq. The pixel Dn has a value between the value of the pixel Sc and that of the pixel Sm. Therefore, it is impossible for the pixel Dn and the pixel Dp to have a peak value in the scaled-up image D_upsl(x).

Thus, in the scaled-up image D_upsl(x), when the to-be-processed pixel (target pixel) has the maximum or minimum value (when the to-be-processed pixel has a peak value)

compared with the adjacent pixels, it is found that the target pixel is located close to the position of a pixel in the interpolation image D_inpl(x).

A pixel having the maximum or minimum value compared with the adjacent pixels (a pixel having a peak value) appears in the scaled-up image D_upsl(x) only when a pixel having the maximum or minimum value compared with the adjacent pixels (a pixel having a peak value) appears also in the interpolation image D_inpl(x).

A case will be discussed in which the scaling-up process is performed by using a method other than linear interpolation.

Figure 5:
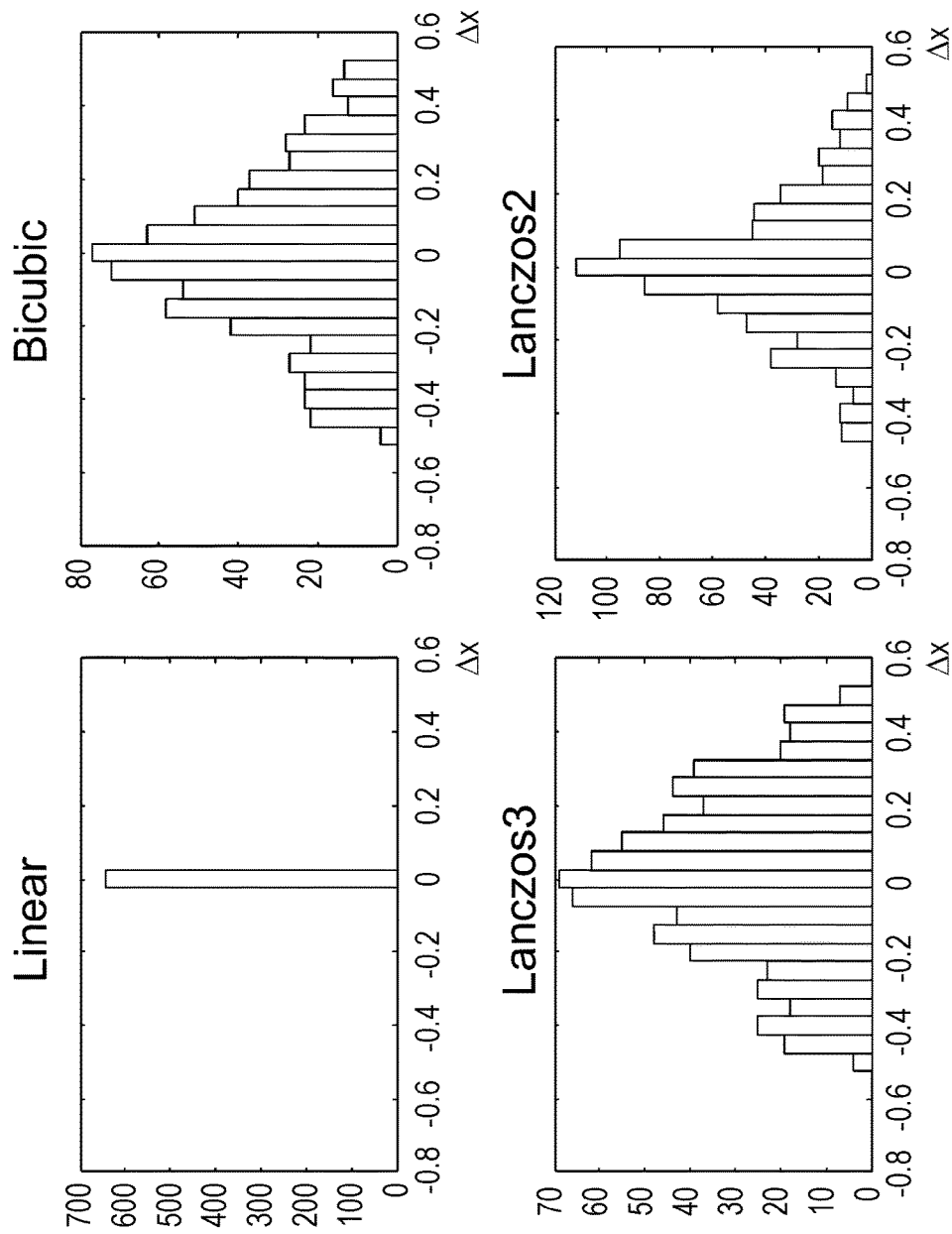
FIG. 5 includes graphs illustrating the amount of a shift (difference between coordinate positions) Δx of a peak pixel and the frequency of occurrence which are produced when a scaling-up process is performed by using (1) a linear interpolation method (Linear method), (2) a Bicubic method, (3) a Lanczos3 method, and (4) a Lanczos4 method.

FIG. 5 illustrates graphs indicating the amount Δx of a shift of a peak pixel (the difference between coordinate positions) and the frequency of occurrence which are produced when the scaling-up process is performed by using (1) a linear interpolation method (Linear method), (2) a Bicubic method, (3) a Lanczos3 method, and (4) a Lanczos4 method. In the graphs in FIG. 5, the horizontal axis represents the difference Δx (corresponding to Δx in FIG. 4) between the coordinate position of a pixel having a peak value in the scaled-up image D_upsl(x) and that in the interpolation image D_inpl(x); and the vertical axis represents the frequency of occurrence.

As seen from the graphs in FIG. 5, any of the methods, using which the scaling-up process is performed, causes appearance of the most frequent value at the point, Δx=0. Therefore, use of this statistical property enables the pixel positions in the interpolation image D_inpl(x) to be estimated.

As described above, it may be determined that a pixel having a peak value in a scaled-up image is located close to the position of a pixel in an interpolation image. Therefore, in image data received by the proximity-degree acquiring unit 1, a pixel having a peak value is set to a higher proximity degree value. Thus, it is possible to adequately express how close to the position of a pixel in the interpolation image, the position of the target pixel is.

Thus, the proximity degree value Q calculated by the proximity-degree calculating unit 12 of the proximity-degree acquiring unit 1 is output to the accumulation unit 2.

The accumulation unit 2 accumulates, for each coordinate position x, proximity degree values Q which are output from the proximity-degree calculating unit 12 of the proximity-degree acquiring unit 1.

For example, when the number of pixels in the horizontal direction in image data is "512", the accumulation unit 2 includes 512 accumulation processors of the first accumulation processor 20, the second accumulation processor 21, . . . , and the 512th accumulation processor 2511.

When the coordinate position is such that x=k(0≤k≤511), the (k+1)th accumulation processor accumulates the proximity degree value Q which is output from the proximity-degree calculating unit 12. This process is performed for one image (for example, for one frame image), and the obtained accumulated values s0 to s511 (when n =511) are output to the frequency transform unit 3. After the above-described accumulation process is performed on image data for one image (for example, for one frame image), the accumulated value for each accumulation processor is reset to "0" by using the reset signal Rst which is output from the spectrum analyzing unit 4. That is, the second selectors 204 to 2n4 of the accumulation processors receive the reset signal Rst (signal value "1"), whereby the accumulated values are reset to "0".

The reason why the accumulation process is performed will be described by using FIG. 6.

Figure 6:
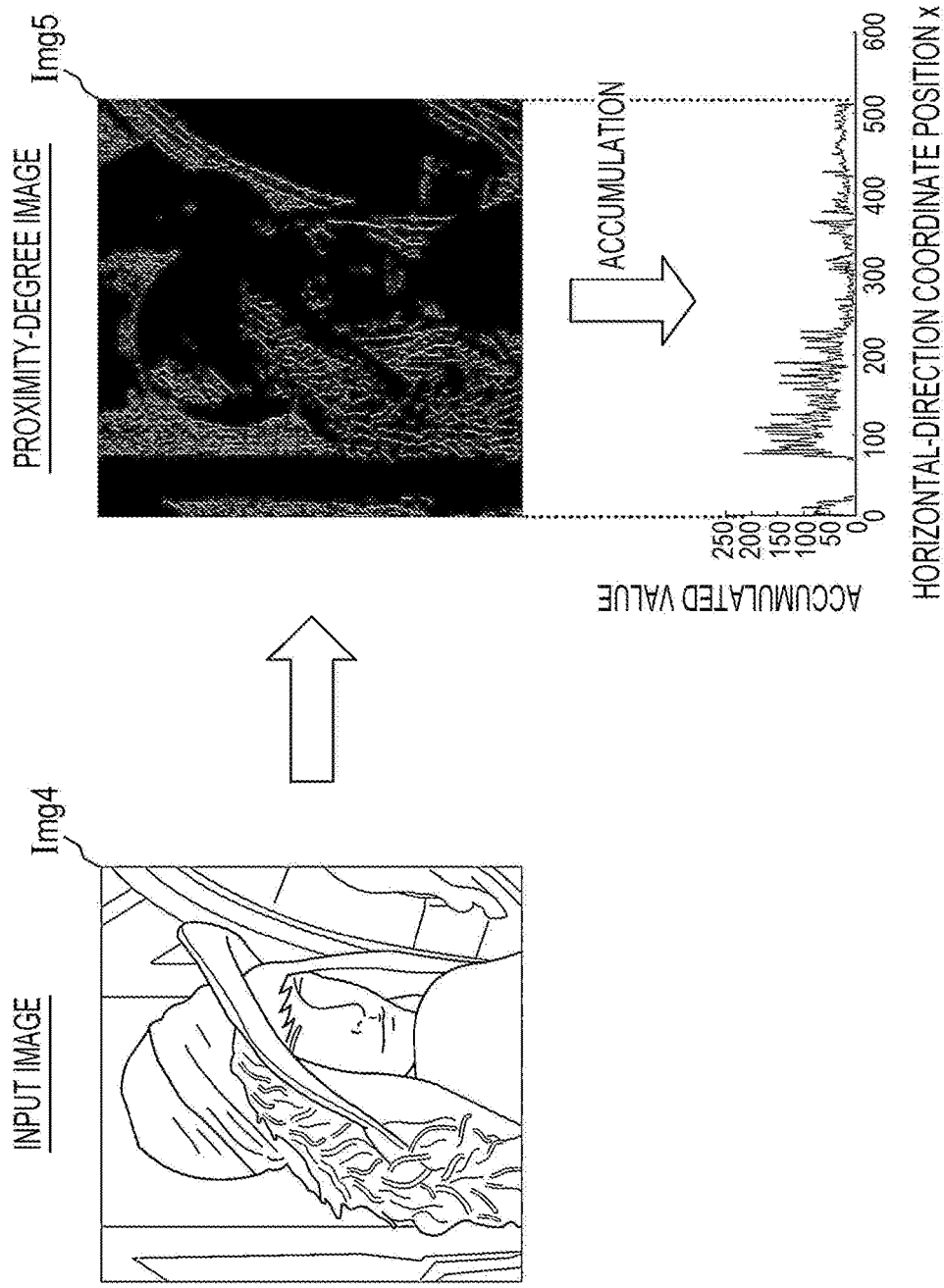
FIG. 6 is a diagram illustrating an input image Img4, a proximity-degree image Img5 obtained from the input image Img4, and a graph illustrating the relationship between coordinate position and accumulated value.

FIG. 6 is a diagram illustrating an input image Img4, a proximity-degree image Img5 obtained from the input image Img4, and a graph indicating the relationship between the coordinate position and the accumulated value.

The proximity-degree image Img5 is an image obtained by mapping the proximity degree value obtained for each pixel on the corresponding pixel position. As a pixel in the input image Img4 is located closer to a pixel position in the interpolation image, the proximity degree value is set higher. In the proximity-degree image Img5, a pixel having a larger proximity degree value is displayed with higher brightness (a pixel whose color is closer to white has a larger proximity degree value).

Typically, in the proximity-degree image, "1" does not necessarily appear at a position close to a sampling position (a pixel position in the interpolation image).

The reason of this is as follows.

For example, in an image region which is present in an image before a scaling-up process, which is flat in terms of brightness, and in which no pixels having the maximum or minimum value (peak value) are present, even when a to-be-processed pixel is located at a position close to a sampling position (a pixel position in the interpolation image), the proximity degree value of the pixel is not large. In addition, as seen from the graphs (histograms) in FIG. 5, in the case where the scaling-up process is performed by using a method other than the linear interpolation method (Linear method), even when a to-be-processed pixel is located at a position close to a sampling position (a pixel position in the interpolation image), the proximity degree value of the pixel is not necessarily the maximum or minimum value (peak value).

For this reason, typically in a proximity-degree image, "1" does not necessarily appear at a position close to a sampling position (a pixel position in the interpolation image).

Therefore, by using the statistical property, sampling positions (pixel positions in the interpolation image) are estimated.

Specifically, the proximity degree values of pixels whose coordinate positions x in the horizontal direction are the same are accumulated (in the vertical direction) for one image (for example, for one frame image), whereby the accumulated proximity degree value is obtained for each coordinate position x in the horizontal direction. The horizontal-direction periodicity of the accumulated proximity degree values, which are thus obtained and each of which is obtained for a corresponding coordinate position x in the horizontal direction, is determined, whereby the resolution (or the scaling-up factor) of the original image may be estimated.

That is, it is difficult to correctly grasp the horizontal-direction periodicity of positions at which the proximity degree values are large, from a small amount of sample data. By using the accumulated proximity degree values, which are obtained as described above and each of which is obtained for a corresponding coordinate position x in the horizontal direction, the number of data samples are increased, enabling the horizontal-direction periodicity of positions at which the proximity degree values are large to be grasped correctly and with higher accuracy.

That is, even when any type of scaling-up process has been performed, a pixel located at a position closer to a sampling position (a pixel position in the interpolation image) has a higher probability that the proximity degree value is large, in the proximity-degree image. Therefore, this statistical property is used, and the number of data samples is increased as described above, enabling the horizontal-direction periodicity of positions at which the proximity degree values are large to be grasped correctly and with higher accuracy.

For this reason, the accumulation unit 2 performs the accumulation process as described above.

The accumulated values s0 to s511 (when n=511) obtained in the accumulation process performed by the accumulation unit 2 are output to the frequency transform unit 3.

The frequency transform unit 3 performs the frequency transform process on the accumulated values s0 to s511 (when n=511) which are received. The frequency transform unit 3 performs, for example, a Fourier transform (a discrete Fourier transform or a fast Fourier transform) on the data sequence of the accumulated values s0 to s511, and obtains frequency component values (a data sequence of spectral values, each of which is obtained for a corresponding frequency component) f0 to f511.

Figure 7:
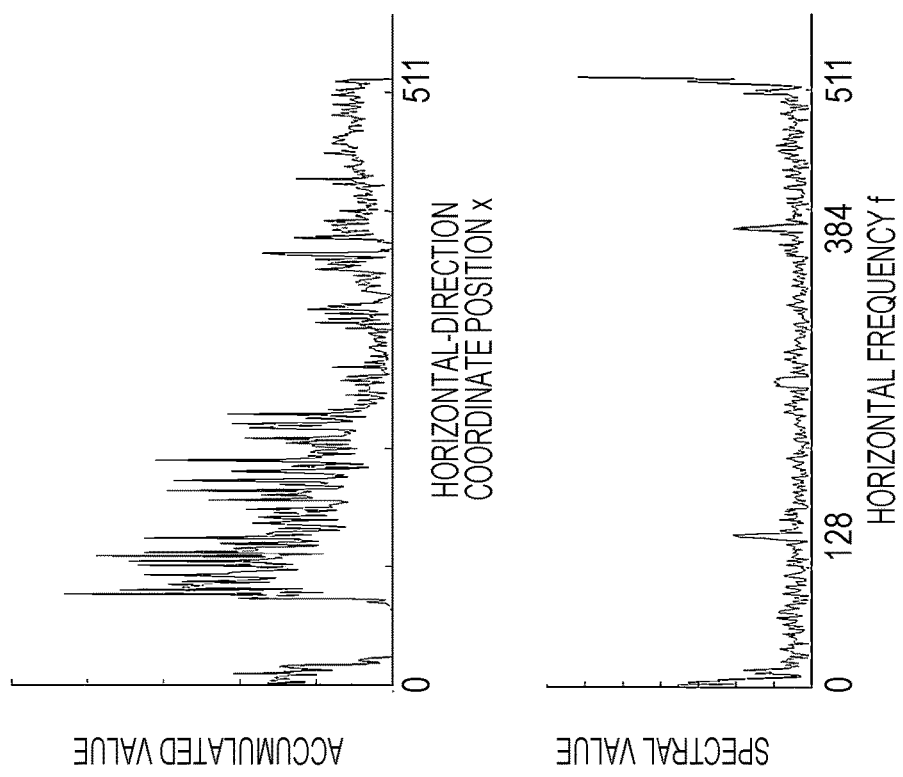
FIG. 7 is a diagram illustrating a state in which a data sequence of accumulated proximity degree values s0 to s511 in FIG. 6 is subjected to a Fourier transform and is converted into frequency component values (a data sequence of the spectral values of frequency components) f0 to f511.

FIG. 7 illustrates a state in which a data sequence of the accumulated proximity degree values s0 to s511 in FIG. 6 (the upper diagram in FIG. 7) is subjected to a Fourier transform and is converted into the frequency component values (a data sequence of spectral values, each of which is obtained for a corresponding frequency component) f0 to f511. In the upper diagram in FIG. 7, data at a horizontal-direction coordinate position, x=k(0≤k≤511), corresponds to the accumulated proximity degree value sk. In the lower diagram in FIG. 7, data for a horizontal frequency, f=k (0≤k≤511), corresponds to the frequency component value fk.

As seen from FIG. 7, as in the upper diagram in FIG. 7, it is difficult to find the periodicity of accumulated proximity degree values from the time-series data. However, as in the lower diagram in FIG. 7, peaks may be easily determined from the data sequence for frequency regions, and the periodicity of accumulated proximity degree values may be easily found.

Thus, to find the periodicity of accumulated proximity degree values easily, the data sequence of f0 to f511 (n=511) for frequency regions which is obtained by the frequency transform unit 3 performing a frequency transform is output from the frequency transform unit 3 to the spectrum analyzing unit 4.

The spectrum analyzing unit 4 estimates the resolution Ndet of the original image (the image before the scaling-up process is performed) from the received data sequence of f0 to f511 (n=511) for frequency regions.

For example, when the data sequence of f0 to f511 for frequency regions as illustrated in the lower diagram in FIG. 7 is received, the spectrum detecting unit 41 of the spectrum analyzing unit 4 specifies positions at which peaks are present. In the case of the lower diagram in FIG. 7, the spectrum detecting unit 41 detects peaks at the positions, f=128 and 384.

Then, the estimated-resolution acquiring unit 42 estimates the resolution Ndet on the basis of the detection result (analysis result) from the spectrum detecting unit 41. Since n=512, as in the lower diagram in FIG. 7, when a peak appears at the position, f=128, the number of pixels of the original image may be estimated as 128 pixels in the horizontal direction. That is, when data of 512 pixels in the horizontal direction corresponds to 1 Hz, presence of a peak at the position, of 128 Hz, means that pixels interpolated in a cycle of 128 Hz are highly likely to be present.

Therefore, in this case, the estimated-resolution acquiring unit 42 of the spectrum analyzing unit 4 estimates the resolution Ndet of the original image (the image before the scaling-up process is performed) as Ndet=128.

In the case where the frequency transform unit 3 obtains the data sequence for frequency regions by using a discrete Fourier transform or a fast Fourier transform, when a peak is present at the position, f=128, another peak is present at the position, f=384, at which a folding component is present.

It is necessary to select either of the two peaks. For example, a range of possible scaling-up factors may be set in advance, and the estimated-resolution acquiring unit 42 of the spectrum analyzing unit 4 may select a peak which falls in the range.

Figure 8:
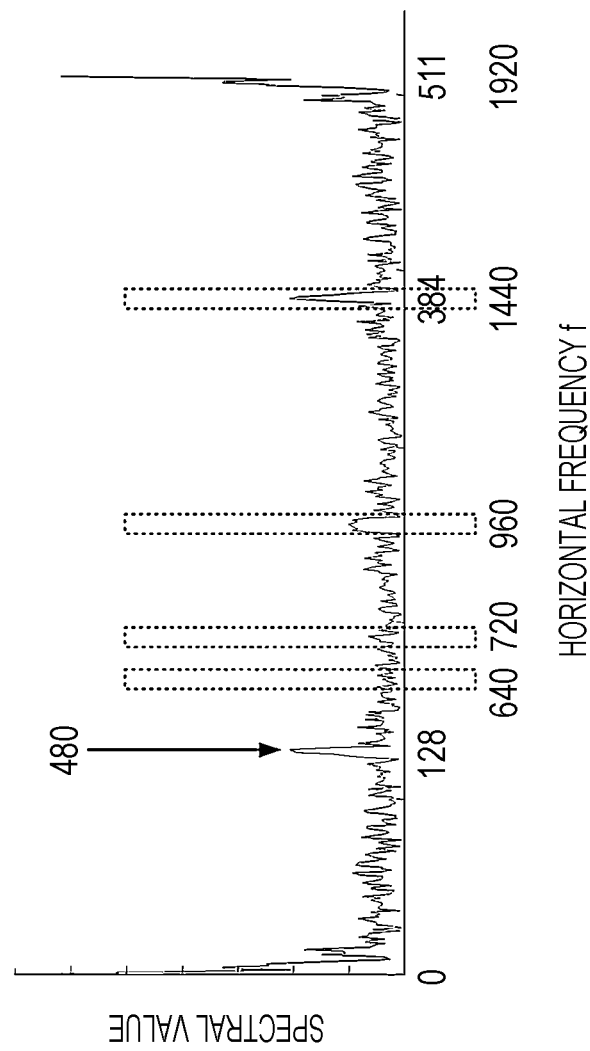
FIG. 8 is a diagram illustrating a frequency spectrum obtained by the frequency transform unit 3.

One example of this will be described by using FIG. 8. illustrates acase in which the frequency transform unit 3 obtains the data sequence of f0 to f511 for frequency regions and in which 1920 pixels are present in the horizontal direction.

In the case of terrestrial digital broadcasting, the horizontal resolution is 1440. In the case of BS broadcasting, the horizontal resolution is 1920. The horizontal resolution for the other movie formats is 720, 640, or the like. That is, variations of the typically used horizontal resolution are not so many. Assume that the variations (possible values) of the horizontal resolution are set to 1440, 960, 720, and 640 in the resolution estimating device 1000. When the spectrum detecting unit 41 of the spectrum analyzing unit 4 receives the data sequence of f0 to f511 for frequency regions in FIG. 8, the spectrum detecting unit 41 detects a peak at the position, f=128 (corresponding to a horizontal resolution of 480), and a peak at the position, f=384 (corresponding to a horizontal resolution of 1440). The estimated-resolution acquiring unit 42 of the spectrum analyzing unit 4 determines whether or not a peak which matches one of the predetermined horizontal resolutions is present among the two detected peaks. In the above-described case, only a horizontal resolution of 1440 is set as a predetermined horizontal resolution. Therefore, the estimated-resolution acquiring unit 42 of the spectrum analyzing unit 4 estimates the resolution Ndet of the original image (the image before the scaling-up process is performed) as
Ndet=384 (corresponding to a horizontal resolution of 1440).

When the process of estimating a resolution is ended (when one image (an image for one frame) has been processed), the spectrum analyzing unit 4 outputs the reset signal Rst (outputs the reset signal Rst which is set to "1") to each accumulation processor of the accumulation unit 2.

The spectrum analyzing unit 4 may use another method in which spectral components are integrated in a frequency region corresponding to each of the horizontal resolutions that are already known well, and in which the horizontal resolution corresponding to the frequency region for which the integrated value is maximum is estimated as the horizontal resolution of the original image. For example, the spectrum detecting unit 41 of the spectrum analyzing unit 4 may integrate the spectral values in a region indicated by using a rectangle illustrated by using a dotted line in FIG. 8, and may detect the region for which the integrated value is maximum (in the case of FIG. 8, the region for a horizontal resolution of 1440). Then, on the basis of the detection result, the estimated-resolution acquiring unit 42 may determine the horizontal resolution corresponding to the region as the horizontal resolution of the original image (in the case of FIG. 8, a horizontal resolution of 1440).

Horizontal resolutions which will not be received by the resolution estimating device 1000 may be excluded in advance, and the process of determining the horizontal resolution of the original image may be performed.

As described above, the spectrum analyzing unit 4 is capable of estimating the horizontal resolution of an original image, and determining (estimating) the resolution Ndet of the original image.

As described above, in the resolution estimating device 1000, the proximity-degree acquiring unit 1 sets proximity degree values Q so that the proximity degree value Q of a pixel having a peak value in the input image Din is higher, and the accumulation unit 2 (vertically) accumulates the proximity degree values Q of pixels whose horizontal-direction coordinates x are identical. Then, in the resolution estimating device 1000, the frequency transform unit 3 performs a frequency transform on a data sequence of proximity degree values Q which is obtained by the accumulation unit 2, and obtains a data sequence for frequency regions. Subsequently, in the resolution estimating device 1000, the spectrum analyzing unit 4 analyzes the data sequence for frequency regions which is obtained by the frequency transform unit 3, whereby the horizontal-direction periodicity of the proximity degree values Q is detected, and the (horizontal) resolution of the original image (the image before the scaling-up process is performed) is specified (estimated).

That is, in the resolution estimating device 1000, proximity degree values, each of which represents positional closeness to a sampling position (a pixel position in the interpolation image),are (vertically) accumulated, whereby the number of proximity degree value samples may be increased, and the periodicity of pixels for which the proximity degree values are large may be adequately detected from a data sequence for frequency regions which is obtained by performing a frequency transform on a time-series data sequence of accumulated proximity degree values.

That is, even when any scaling-up process is performed, the probability that a pixel located closer to a sampling position (a pixel position in the interpolation image) has a larger proximity degree value in the proximity-degree image (the image obtained by mapping proximity degree values) is high. Therefore, the resolution estimating device 1000 uses this statistical property. By increasing the number of data samples as described above, the horizontal-direction periodicity of positions at which the proximity degree values are large may be grasped correctly and with higher accuracy.

Thus, the resolution estimating device 1000 may adequately estimate the resolution of the original image (original video) of any received image signal (video signal).

<<First Modified Example>>

A first modified example of the first embodiment will be described.

Components similar to those in the embodiment are designated with identical reference numerals, and will not be described in detail.

Figure 9:
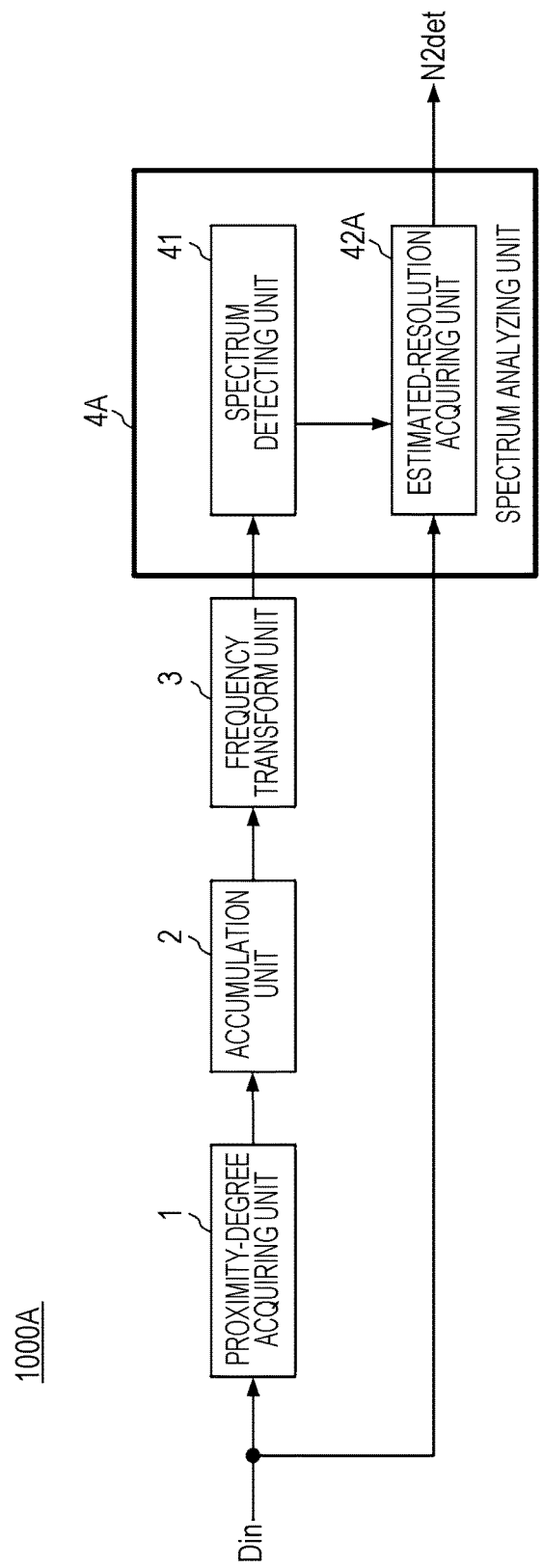
FIG. 9 is a schematic diagram of the configuration of a resolution estimating device 1000A according to a first modified example of the first embodiment.

FIG. 9 is a schematic diagram of the configuration of a resolution estimating device 1000A according to the first modified example of the first embodiment.

Figure 10:
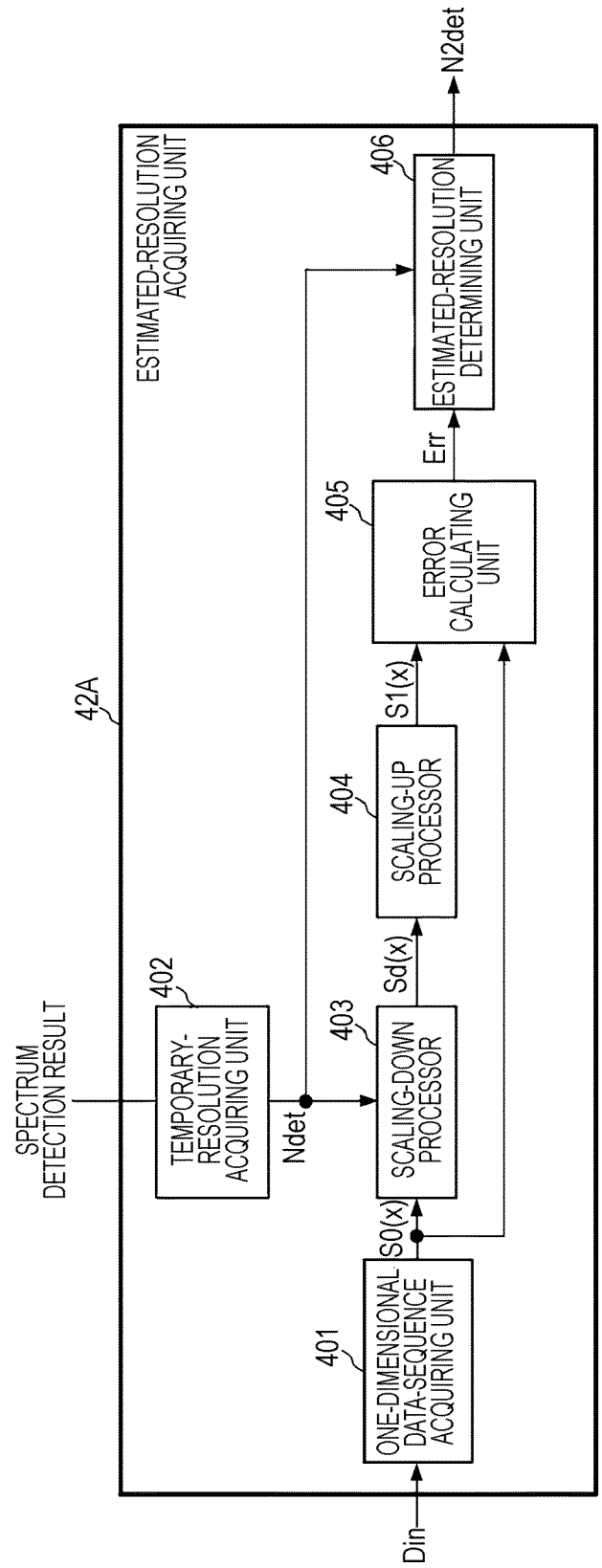
FIG. 10 is a schematic diagram of the configuration of an estimated-resolution acquiring unit 42A of the resolution estimating device 1000A according to the first modified example of the first embodiment.

FIG. 10 is a schematic diagram of the configuration of an estimated-resolution acquiring unit 42A of the resolution estimating device 1000A according to the first modified example of the first embodiment.

As illustrated in FIG. 9, the resolution estimating device 1000A according to the present modified example has a configuration in which the spectrum analyzing unit 4 is replaced with a spectrum analyzing unit 4A in the resolution estimating device 1000 according to the first embodiment.

That is, as illustrated in FIG. 9, the resolution estimating device 1000A according to the present modified example has a configuration in which the estimated-resolution acquiring unit 42 is replaced with an estimated-resolution acquiring unit 42A in the resolution estimating device 1000 according to the first embodiment.

As illustrated in FIG. 10, the estimated-resolution acquiring unit 42A includes a one-dimensional data-sequence acquiring unit 401, a temporary-resolution acquiring unit 402, a scaling-down processor 403, a scaling-up processor 404, an error calculating unit 405, and an estimated-resolution determining unit 406.

The one-dimensional data-sequence acquiring unit 401 which receives the input image Din sums pixel values in the vertical direction in the input image Din, and acquires a one-dimensional data sequence $S0(x)$. Then, the one-dimensional data-sequence acquiring unit 401 outputs the acquired one-dimensional data sequence $S0(x)$ to the scaling-down processor 403 and the error calculating unit 405.

The temporary-resolution acquiring unit 402 which receives the spectrum detection result which is output from the spectrum detecting unit 41 acquires a temporary resolution Ndet on the basis of the spectrum detection result. The temporary-resolution acquiring unit 402 performs a process similar to that performed by the estimated-resolution acquiring unit 42 according to the first embodiment, thereby acquiring the temporary resolution Ndet. That is, the temporary resolution Ndet is similar to the resolution Ndet acquired by the estimated-resolution acquiring unit 42 according to the first embodiment.

The scaling-down processor 403 receives the one-dimensional data sequence $S0(x)$ which is output from the one-dimensional data-sequence acquiring unit 401, and the value (signal) Ndet indicating the temporary resolution which is output from the temporary-resolution acquiring unit 402. The scaling-down processor 403 performs a scaling-down process on the one-dimensional data sequence $S0(x)$ on the basis of the temporary resolution Ndet. The scaling-down processor 403 outputs a one-dimensional data sequence obtained after the scaling-down process, as a one-dimensional data sequence $Sd(x)$ to the scaling-up processor 404.

The scaling-up processor 404 which receives the one-dimensional data sequence $Sd(x)$ from the scaling-down processor 403 performs the scaling-up process on the received one-dimensional data sequence $Sd(x)$ so that the resulting data sequence has the same horizontal resolution (the same data amount) as that of the one-dimensional data sequence $S0(x)$, and obtains a one-dimensional data sequence $S1(x)$. Then, the scaling-up processor 404 outputs the one-dimensional data sequence $S1(x)$ obtained after the scaling-up process, to the error calculating unit 405.

The error calculating unit 405 receives the one-dimensional data sequence $S0(x)$ which is output from the one-dimensional data-sequence acquiring unit 401, and the one-dimensional data sequence $S1(x)$ which is output from the scaling-up processor 404. The error calculating unit 405 calculates an error between the one-dimensional data sequence $S0(x)$ and the one-dimensional data sequence $S1(x)$ which are received, and outputs a value (error signal) Err indicating the calculated error, to the estimated-resolution determining unit 406.

The estimated-resolution determining unit 406 which receives the error signal Err which is output from the error calculating unit 405 estimates (determines) a resolution N2det of the original image (the image before the scaling-up process is performed) of the input image Din, on the basis of the error signal Err. Then, the estimated-resolution determining unit 406 outputs the determined (estimated) resolution N2*det*.

Operations performed by the resolution estimating device 1000A having the above-described configuration will be described.

The processes until that of the spectrum detecting unit 41 of the spectrum analyzing unit 4 are similar to those in the first embodiment, and will not be described.

In the description below, a case will be described in which the frequency transform unit 3 has obtained a data sequence for frequency regions which is illustrated in the lower diagram in FIG. 7, and in which the temporary-resolution acquiring unit 402 has output the temporary resolution Ndet as "128" (a resolution corresponding to 128 pixels) on the basis of the spectrum detection result which is output from the spectrum detecting unit 41.

In this case, as described in the first embodiment, the following possible cases are present: a case in which the resolution of the original image (the image before the scaling-up process) of the input image Din is "128"; and a case in which the resolution of the original image is "384" (a resolution corresponding to a folding component).

In the resolution estimating device 1000A according to the present modified example, a process is performed so that the correct resolution is adequately selected among the two estimated resolution candidates. This will be described specifically below. In the present modified example, the resolution having a smaller value is designated as N1, and the resolution having a larger value (a resolution corresponding to a folding component) is designated as N2. The temporary-resolution acquiring unit 402 always selects the resolution N1 having a smaller value, among the resolution candidates N1 and N2 of the original image, and sets the resolution N1 to Ndet.

The one-dimensional data-sequence acquiring unit 401 of the estimated-resolution acquiring unit 42A sums pixel values in the vertical direction from the input image Din (an image having a horizontal resolution of 512), and generates the one-dimensional data sequence S0(x). That is, the one-dimensional data-sequence acquiring unit 401 (vertically) accumulates the pixel values of pixels for which the coordinate positions x in the horizontal direction are identical, in the input image Din, and obtains S0(x). In the present modified example, since the input image has 512 pixels in the horizontal direction, the one-dimensional data sequence S0(x) (0≤x≤511) obtained by the one-dimensional data-sequence acquiring unit 401 is a data sequence constituted by 512 pieces of data.

As described above, the one-dimensional data sequence S0(x) acquired by the one-dimensional data-sequence acquiring unit 401 is output to the scaling-down processor 403 and the error calculating unit 405.

The scaling-down processor 403 performs the scaling-down process on the one-dimensional data sequence S0(x) (a data sequence having 512 elements) which is output from the one-dimensional data-sequence acquiring unit 401 so that the resulting data sequence has a (horizontal) resolution specified by the resolution Ndet (=128). The data sequence after the scaling-down process is output as the one-dimensional data sequence Sd(x) (a data sequence having 128 elements) to the scaling-up processor 404.

The scaling-up processor 404 performs the scaling-up process on the one-dimensional data sequence Sd(x) so that the one-dimensional data sequence Sd(x) (a data sequence having 128 elements) after the scaling-down process which is output from the scaling-down processor 403 has the same horizontal resolution (=512 pixels) as that of the data sequence S0(x) before the scaling-down process, that is, so that the one-dimensional data sequence Sd(x) is a data sequence having the same number of pieces of data as those in the data sequence S0(x) before the scaling-down process. Then, the one-dimensional data sequence after the scaling-up process is output as the data sequence S1(x) (a data sequence having 512 elements) to the error calculating unit 405.

The error calculating unit 405 calculates an error between the one-dimensional data sequence S0(x) (a data sequence having 512 elements) which is output from the one-dimensional data-sequence acquiring unit 401 and the one-dimensional data sequence S1(x) (a data sequence having 512 elements) which is output from the scaling-up processor 404. Specifically, the error calculating unit 405 obtains the error Err by performing a process corresponding to Expression 1.

[Expression 1]

$$Err = \sum_{i=0}^{n} \frac{(S1(x) - S0(x))^2}{S0(x)^2} \qquad (1)$$

In the above-described expression, n=511.

The error Err obtained as described above is output to the estimated-resolution determining unit 406.

The estimated-resolution determining unit 406 compares the received error Err with a predetermined threshold Th (for example, Th=0.001).

When Err>Th, $$N2det=N2. \qquad (1)$$

That is, among the estimated resolution candidates, the resolution (a resolution corresponding to a folding component) N2 having a larger value (in the above-described example, 384 pixels) is determined as the estimated resolution N2*det*.

When Err≤Th, $$N2det=N1=Ndet. \qquad (2)$$

That is, among the estimated resolution candidates, the resolution N1 having a smaller value (in the above-described example, 128 pixels) is determined as the estimated resolution N2*det*.

The determined estimated resolution N2*det* is output from the estimated-resolution determining unit 406.

The reason why the above-described process enables an adequate estimated resolution to be obtained will be described.

Assume that the input image Din is an image obtained by performing a scaling-up process on the original image having a horizontal resolution of 128 (128 horizontal pixels). The data sequence (a data sequence having 512 elements) obtained by the one-dimensional data-sequence acquiring unit 401 converting the input image Din into one-dimensional data is scaled down to a data sequence having 128 elements (a data sequence corresponding to a horizontal resolution of 128), and the scaled-down data sequence is then scaled up to an original data sequence having a horizontal resolution of 512 (a data sequence having 512 elements). In this case, a change in the data sequence (signal) is small. That is, the value of the error Err calculated by the error calculating unit 405 is small.

In contrast, assume that the input image Din is an image obtained by performing the scaling-up process on the original image having a horizontal resolution of 384 (384 horizontal pixels). The data sequence (a data sequence having 512 elements) obtained by the one-dimensional data-sequence acquiring unit 401 converting the input image Din into one-dimensional data is scaled down to a data sequence having 128 elements (a data sequence corresponding to a horizontal resolution of 128), and the scaled-down data sequence is then scaled up to an original data sequence (a data sequence having 512 elements) having 512 elements. In this case, some of high-frequency components which may appear if the horizontal resolution is 384 are lost during the scaling-down process and the scaling-up process. Therefore, in this case, the value of the error Err calculated by the error calculating unit 405 is large.

For this reason, the estimated-resolution acquiring unit 42A performs the above-described process, whereby a more adequate candidate may be specified as the estimated resolution among two candidates, i.e., the temporary resolution acquired by the temporary-resolution acquiring unit 402 and the resolution corresponding to a folding component, on the basis of the spectrum detection result obtained by the spectrum detecting unit 41.

As described above, in the resolution estimating device 1000A according to the present modified example, the estimated-resolution acquiring unit 42A scales down the one-dimensional data sequence $S0(x)$ obtained from the input image Din to the resolution of a candidate having a smaller value among two estimated resolution candidates which is acquired by the temporary-resolution acquiring unit 402, on the basis of the spectrum detection result from the spectrum detecting unit 41. The estimated-resolution acquiring unit 42A then acquires the scaled-up one-dimensional data sequence $S1(x)$. Then, in the resolution estimating device 1000A, the error calculating unit 405 calculates an error between the one-dimensional data sequence $S0(x)$ and the one-dimensional data sequence $S1(x)$. On the basis of the calculated error, a more adequate candidate is specified as the estimated resolution among the two candidates, i.e., the temporary resolution acquired by the temporary-resolution acquiring unit 402 and the resolution corresponding to a folding component, on the basis of the spectrum detection result from the spectrum detecting unit 41.

Therefore, the resolution estimating device 1000A may more adequately determine (estimate) the resolution of the original image (the image before the scaling-up process) of the input image Din.

<<Second Modified Example>>

A second modified example of the first embodiment will be described.

In the second modified example of the first embodiment, an example will be described in which the vertical resolution of an image (video) is estimated.

Components similar to those in the embodiment are designated with identical reference numerals, and will not be described in detail.

Figure 11:
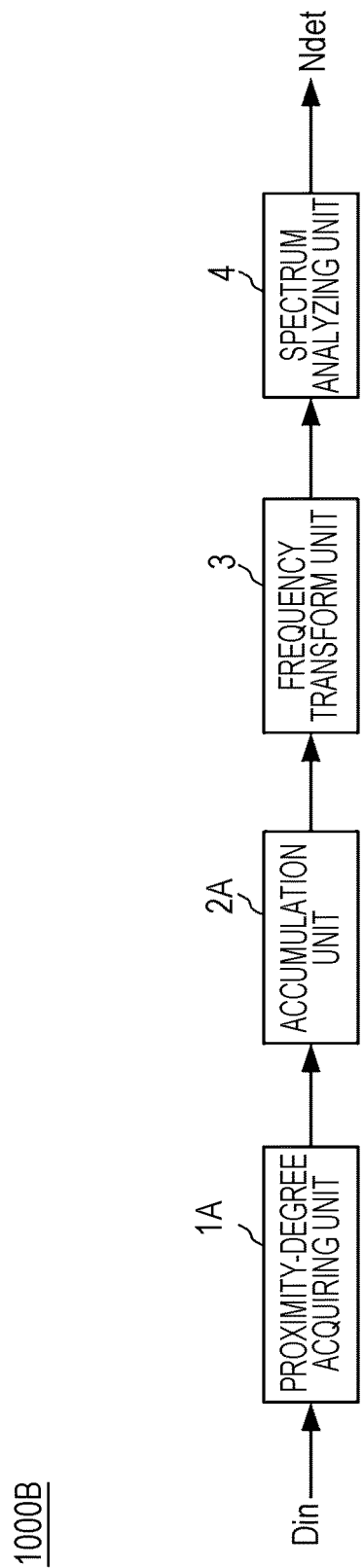
FIG. 11 is a schematic diagram of the configuration of a resolution estimating device 1000B according to a second modified example of the first embodiment.

FIG. 11 is a schematic diagram of the configuration of a resolution estimating device 1000B according to the second modified example of the first embodiment.

Figure 12:
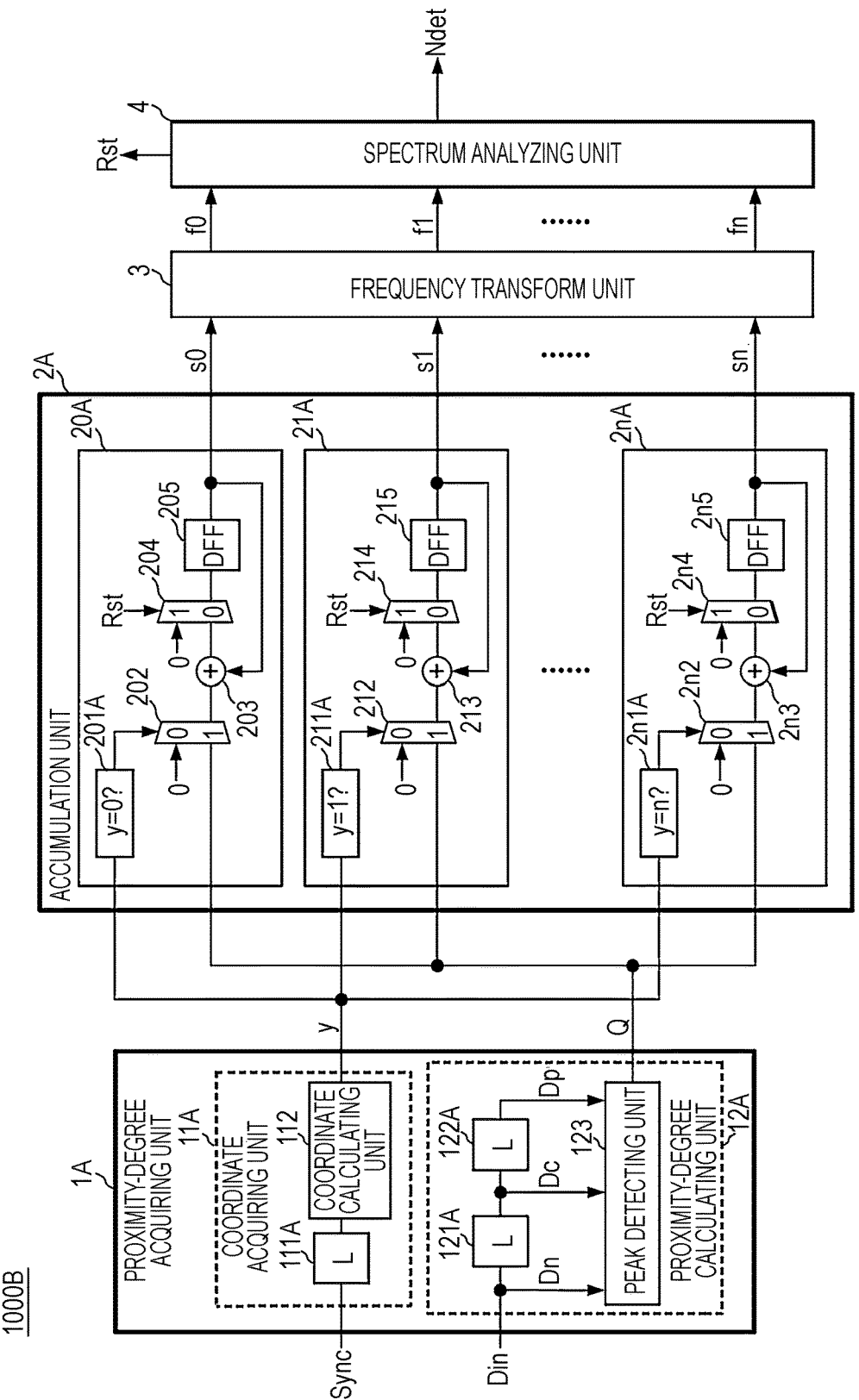
FIG. 12 is a schematic diagram of the configuration in which the resolution estimating device 1000B according to the second modified example of the first embodiment is configured with hardware.

FIG. 12 is a schematic diagram of the configuration (an example) in which the resolution estimating device 1000B according to the second modified example of the first embodiment is configured with hardware.

As illustrated in FIG. 11, the resolution estimating device 1000B according to the present modified example has a configuration in which the proximity-degree acquiring unit 1 is replaced with a proximity-degree acquiring unit 1A and the accumulation unit 2 is replaced with an accumulation unit 2A in the resolution estimating device 1000 according to the first embodiment.

As illustrated in FIG. 12, the proximity-degree acquiring unit 1A according to the present modified example has a configuration in which the coordinate acquiring unit 11 is replaced with a coordinate acquiring unit 11A and the proximity-degree calculating unit 12 is replaced with a proximity-degree calculating unit 12A in the proximity-degree acquiring unit 1 according to the first embodiment. That is, the proximity-degree acquiring unit 1A according to the present modified example of the first embodiment has a configuration in which the D flip-flops 111, 121, and 122 are replaced with one-line delay devices (for example, line memories) 111A, 121A, and 122A in the proximity-degree acquiring unit 1 in the first embodiment.

Thus, the coordinate acquiring unit 11A outputs a vertical-direction coordinate y of the image to the accumulation unit 2A, and the proximity-degree calculating unit 12A outputs, to the accumulation unit 2A, the proximity degree value Q of a pixel corresponding to the vertical coordinate y.

As illustrated in FIG. 12, coordinate determining units 201A to $2n1$A of the accumulation processors of the accumulation unit 2A according to the present modified example receive a vertical coordinate y which is output from the coordinate acquiring unit 11A of the proximity-degree acquiring unit 1A. When each of the coordinate determining units determines that the received vertical coordinate y matches a value which is set as illustrated in FIG. 12, the coordinate determining unit outputs "1" to the first selector. When the received vertical coordinate y does not match the set value, the coordinate determining unit outputs "0" to the first selector. Other than these, the operations are similar to those in the first embodiment.

The resolution estimating device 1000B according to the present modified example which has the above-described configuration is different from the resolution estimating device 1000 according to the first embodiment in that the resolution estimating device 1000A calculates a proximity degree value Q from three continuous pixels in the vertical direction on an image and accumulates proximity degree values Q in the horizontal direction on the image.

That is, the resolution estimating device 1000 according to the first embodiment calculates a proximity degree value Q in the horizontal direction on an image, and accumulates proximity degree values Q in the vertical direction on the image. In contrast, the resolution estimating device 1000B according to the present modified example calculates a proximity degree value Q in the vertical direction on an image and accumulates proximity degree values Q in the horizontal direction on the image. This point is the difference between the resolution estimating device 1000B according to the present modified example and the resolution estimating device 1000 according to the first embodiment.

The process of determining (estimating) the estimated resolution is similar to that in the first embodiment.

In the resolution estimating device 1000B according to the present modified example, similarly to the resolution estimating device 1000 according to the first embodiment, the resolution of the original image (original video) of any received image signal (video signal) may be adequately estimated.

[Second Embodiment]

A second embodiment will be described.

Figure 13:
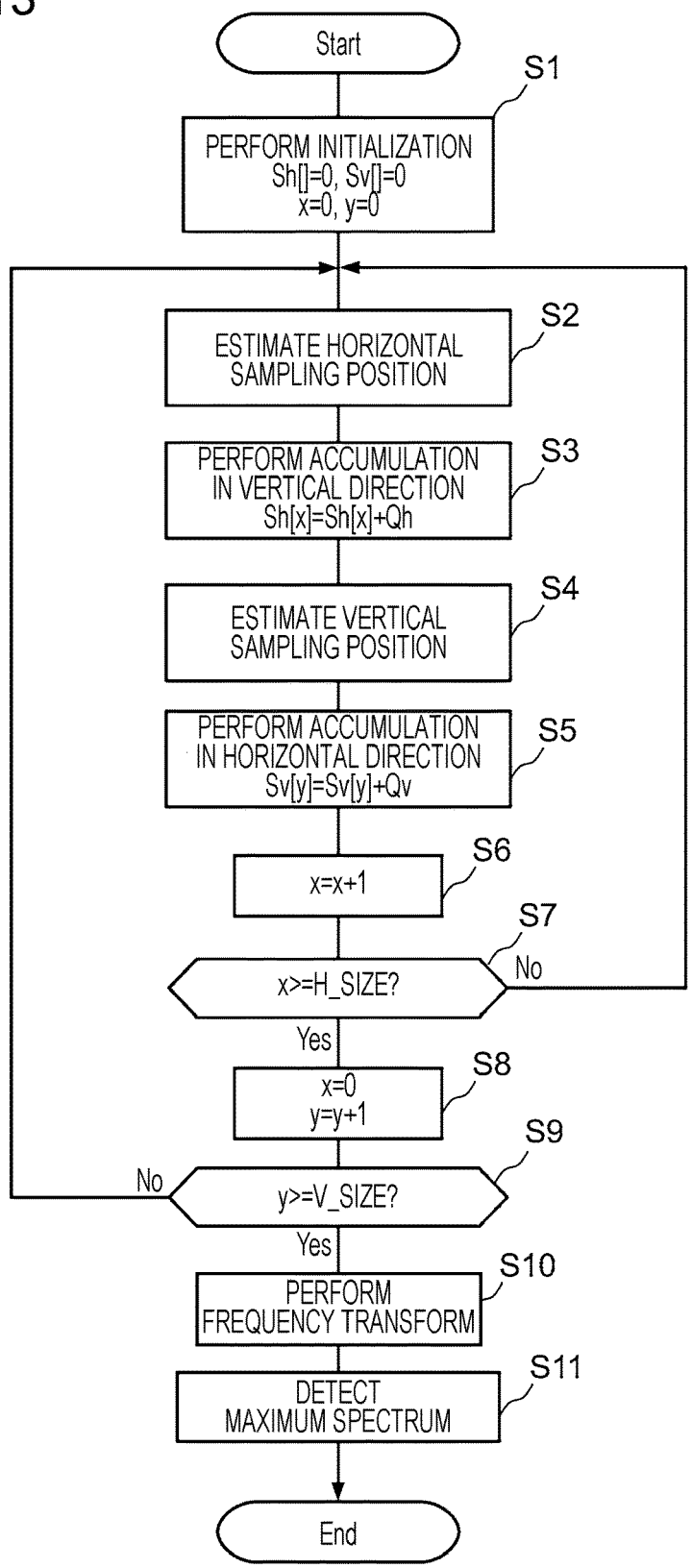
FIG. 13 is a flowchart of a resolution estimation method according to a second embodiment.

FIG. 13 is a flowchart of a resolution estimation method according to the second embodiment.

By using the flowchart in FIG. 13, the resolution estimation method according to the present embodiment will be described.

The resolution estimation method according to the present embodiment is performed, for example, by the resolution estimating device 1000 according to the first embodiment.

An example will be described below in which the resolution estimating device 1000 according to the first embodiment performs the resolution estimation method according to the present embodiment.

(S1):

In step S1, an array Sh[] for horizontal accumulated values which is prepared for the horizontal coordinates x on an image and which is held by the accumulation unit 2 is reset, and an array Sv[] for vertical accumulated values which is prepared for the vertical coordinates y on the image and which is held by the accumulation unit 2 is also reset. All array elements are set to "0". In step S1, both of a horizontal coordinate value x and a vertical coordinate value y on the image are set to "0".

(S2):

In step S2, the proximity-degree acquiring unit 1 calculates a horizontal proximity degree Qh.

Specifically, assume that the pixel value of a pixel at the coordinates (x, y) on the input image is designated as D(x, y) and that the pixel value of the target pixel is represented by D(x, y).

(1) By using three pixels which are continuous in the horizontal direction with the target pixel located at the center and whose pixel values are represented by D(x−1, y), D(x, y), and D(x+1, y), in the case where only D(x, y) is the maximum or minimum value, the proximity-degree acquiring unit 1 sets the proximity degree value Qh of the target pixel as follows.

$$Qh=1$$

(2) Among the pixel values D(x−1, y), D(x, y), and D(x+1, y), in the case where D(x, y) is the maximum or minimum value, and where either of D(x−1, y) and D(x+1, y) is the same value as D(x, y), the proximity-degree acquiring unit 1 sets the proximity degree value Qh of the target pixel as follows.

$$Qh=0.5$$

(3) In cases other than (1) or (2) described above, the proximity-degree acquiring unit 1 sets the proximity degree value Qh of the target pixel as follows.

$$Qh=0$$

(S3):

In step S3, the accumulation unit 2 performs the process of accumulating the proximity degree value Qh in the vertical direction of the image. That is, the accumulation unit 2 performs the process corresponding to the following expression.

$$Sh[x]=Sh[x]+Qh$$

(S4):

In step S4, the proximity-degree acquiring unit 1 calculates a vertical proximity degree Qv.

That is, the following process is performed.

(1) Among three pixels which are continuous in the vertical direction with the target pixel located at the center and whose pixel values are represented by D(x, y−1), D(x, y), and D(x, y+1), in the case where only D(x, y) is the maximum or minimum value, the proximity-degree acquiring unit 1 sets the proximity degree value Qv of the target pixel as follows.

$$Qv=1$$

(2) Among the pixel values D(x, y−1), D(x, y), and D(x, y+1), in the case where D(x, y) is the maximum or minimum value and where either of D(x, y−1) and D(x, y+1) is the same value as D(x, y), the proximity-degree acquiring unit 1 sets the proximity degree value Qv of the target pixel as follows.

$$Qv=0.5$$

(3) In cases other than (1) or (2) described above, the proximity-degree acquiring unit 1 sets the proximity degree value Qv of the target pixel as follows.

$$Qv=0$$

(S5):

In step S5, the accumulation unit 2 performs the process of accumulating the proximity degree value Qv in the horizontal direction of the image. That is, the accumulation unit 2 performs the process corresponding to the following expression.

$$Sv[y]=Sv[y]+Qv$$

(S6, S7):

In step S6, the horizontal-coordinate value x is incremented by +1.

In step S7, it is determined whether or not the horizontal-coordinate value x is equal to or more than the maximum H_SIZE in the horizontal direction (the number of pixels in the horizontal direction). If the determination result is "Yes", the process proceeds to step S8. In contrast, if the determination result is "No", the process returns back to step S2.

(S8, S9):

In step S8, the horizontal-coordinate value x is reset to "0", and the vertical-coordinate value y is incremented by +1.

In step S9, it is determined whether or not the vertical-coordinate value y is equal to or more than the maximum V_SIZE in the vertical direction (the number of pixels in the vertical direction). If the determination result is "Yes", the process proceeds to step S10. In contrast, if the determination result is "No", the process returns back to step S2.

(S10):

In step S10, the frequency transform unit 3 performs a Fourier transform (a discrete Fourier transform, a fast Fourier transform, or the like) on the data sequence Sh[ ] obtained by performing the accumulation process in the horizontal direction for one image (for example, one frame image), and obtains a data sequence Fh[ ] for horizontal frequency regions.

In step S10, the frequency transform unit 3 also performs a Fourier transform (a discrete Fourier transform, a fast Fourier transform, or the like) on the data sequence Sv obtained by performing the accumulation process in the vertical direction for one image (for example, one frame image), and obtains a data sequence Fv[ ] for vertical frequency regions.

(S11):

In step S11, the spectrum analyzing unit 4 detects peaks from the data sequence Fh[ ] for horizontal frequency regions obtained in step S10, and estimates the horizontal resolution of the original image (the image before the scaling-up process) of the input image on the basis of the peaks.

In step S11, the spectrum analyzing unit 4 also detects peaks from the data sequence Fv[ ] for vertical frequency regions obtained in step S10, and estimates the vertical resolution of the original image (the image before scaling-up process) of the input image on the basis of the peaks.

As described above, by performing the resolution estimation method according to the present embodiment, the resolution of the original image (original video) of any received image signal (video signal) may be adequately estimated.

Other Embodiments

In the above-described embodiments (including the modified examples), the case in which the proximity-degree acquiring unit receives the synchronization signal Sync (for example, in the cases of FIGS. 2 and 12) is described. This is not limiting. For example, the proximity-degree acquiring unit may acquire a signal (data) corresponding to the synchronization signal Sync from the input image Din, and may perform the coordinate calculation process by using the acquired signal (data).

In the above-described embodiments (including the modified examples), the case in which the frequency transform unit performs a frequency transform using a Fourier transform is described. However, this is not limiting. As long as the periodicity of a data sequence may be found, another frequency transform (for example, a discrete cosine transform, a wavelet transform, or the like) may be used to perform a frequency transform.

A combination of some or all of the above-described embodiments (including the modified examples) may be used to achieve the resolution estimating device and the resolution estimation method.

The scaling-up factor in the vertical direction of an input image may be different from that in the horizontal direction. For example, an input image (input video) may be an image (video) obtained by enlarging a 640×480 image (video) to a 1920×1080 image (video), or may be an image (video) obtained by enlarging a 1440×1080 image (video) to a 1920×1080 image (video). For these input images (videos), the process performed by the resolution estimating device (including the combination of some or all of the above-described embodiments (including the modified examples)) or the resolution estimation method (including the combination of some or all of the above-described embodiments (including the modified examples)) according to the above-described embodiments (including the modified examples) may be performed.

Part or all of the resolution estimating device according to the above-described embodiments may be implemented as an integrated circuit (for example, an LSI or a system LSI).

Part or all of the process of each functional block according to the above-described embodiments may be implemented through programs. Part or all of the process of each functional block of the above-described embodiments may be performed by a central processing unit (CPU) in a computer. A program for performing each process may be stored in a storage device, such as a hard disk or a ROM, and may be read by the central processing unit (CPU) from the ROM or a RAM for execution.

Each process according to the above-described embodiments may be implemented through hardware, or may be implemented through software (including a case in which the process is implemented by using an OS (operating system), middleware, or a predetermined library). The process may be implemented in a process in which software and hardware are used in a mixed manner.

When the resolution estimating device according to the above-described embodiments is implemented through hardware, it is needless to say that timing needs to be adjusted to perform the processes. In the above-described embodiments, for convenience of description, detailed description about timing adjustment of various signals which occur in an actual hardware design is not made. A delay device or the like for performing a timing adjustment operation is not illustrated.

The execution order in the processing method according to the above-description embodiments is not necessarily limited to the description about the above-described embodiments. Without departing from the gist of the invention, the execution order may be changed.

A computer program for causing a computer to perform the above-described method, and a computer-readable recording medium in which the program is recorded are encompassed in the scope of the invention. Examples of a computer-readable recording medium include a flexible disk, a hard disk, a CD-ROM, an MO, a DVD, a large-capacity DVD, a next-generation DVD, and a semiconductor memory.

The above-described computer program is not limited to one recorded in the recording medium, and may be one transmitted via a telecommunication line, a wireless or wired communication line, a network typified by the Internet, or the like.

The specific configuration of the present invention is not limited to the above-described embodiments, and various changes and modifications may be made without departing from the gist of the invention.

[Additional Statement]

The present invention may be also represented as follows.

In a first invention, there is provided a resolution estimating device which estimates the resolution of the original image, which is an image before a scaling-up process, of an input image. The resolution estimating device includes a proximity-degree acquiring unit, an accumulation unit, a frequency transform unit, and a spectrum analyzing unit.

The proximity-degree acquiring unit sets an estimated proximity degree of each target pixel in such a manner that, as the pixel position of the target pixel is assumed to be closer to a pixel position at which a pixel in the original image is disposed when the original image is scaled up, the estimated proximity degree is set larger.

The accumulation unit accumulates the estimated proximity degrees of the target pixels in a second direction orthogonal to a first direction on the image, and obtains a one-dimensional data sequence of the accumulated estimated-proximity-degree values.

The frequency transform unit performs a frequency transform on the one-dimensional data sequence of the accumulated estimated-proximity-degree values obtained by the accumulation unit, and obtains a one-dimensional frequency-component data sequence which is a one-dimensional data sequence for frequency regions.

The spectrum analyzing unit detects periodicity in the first direction on an image of the estimated proximity degrees on the basis of the one-dimensional frequency-component data sequence obtained by the frequency transform unit, and estimates the resolution of the original image, which is an the image before the scaling-up process, of the input image on the basis of the detected periodicity.

In the resolution estimating device, the proximity-degree acquiring unit sets the estimated proximity degree of a target pixel in the following manner. In an input image, as the pixel position of the target pixel is assumed to be closer to a pixel position, at which a pixel in the original image is disposed when the original image is scaled up, the estimated proximity degree is set larger. For pixels having the same first-direction (for example, horizontal-direction) coordinate, the accumulation unit accumulates the values of the estimated proximity degrees (estimated-proximity-degree values) in the second direction (for example, the vertical direction). In the resolution estimating device, the frequency transform unit performs a frequency transform on a one-dimensional data sequence of the accumulated estimated-proximity-degree values obtained by the accumulation unit, and obtains a data sequence for frequency regions. In the resolution estimating device, the spectrum analyzing unit analyzes the data sequence for frequency regions which is obtained by the frequency transform unit, whereby the first-direction (for example, horizontal-direction) periodicity of the estimated-proximity-degree values is detected, and the first-direction (for example, horizontal-direction) resolution of the original image (the image before the scaling-up process is performed) is specified (estimated).

That is, in the resolution estimating device, the number of estimated-proximity-degree values, each of which represents positional closeness to a sampling position (a pixel position in an interpolation image), is accumulated in the second direction (for example, the vertical direction), whereby the number of estimated-proximity-degree value samples may be increased. Further, the periodicity of pixels having high estimated-proximity-degree values may be adequately detected from a data sequence for frequency regions which is obtained by performing a frequency transform on a time-series data sequence of the accumulated estimated-proximity-degree values.

That is, even when any scaling-up process is performed, the probability that a pixel located at a position closer to a sampling position (a pixel position in an interpolation image) has a larger estimated-proximity-degree value in an estimated-proximity-degree image (an image obtained by mapping estimated-proximity-degree values) is high. Therefore, in the resolution estimating device, this statistical property is used to increase the number of data samples as described above, whereby the first-direction (for example, horizontal-direction) periodicity of positions at which estimated-proximity-degree values are large may be correctly grasped with higher accuracy.

Thus, in the resolution estimating device, the resolution of the original image (original video) of any received image signal (video signal) may be adequately estimated.

The "estimated proximity degree" is an indicator indicating positional closeness of the pixel position of a target pixel on an image to a pixel position on an interpolation image obtained by performing an insertion process (interpolation) on the original image of an input image. A proximity degree is set, for example, as follows. A proximity degree is set larger as the pixel position of a target pixel on an image is closer to a pixel position on an interpolation image obtained from the original image.

That is, the "estimated proximity degree" is an indicator indicating how close a distance is in the coordinate space obtained after a scaling-up process. The distance is a distance between a pixel in an input image which is disposed in an insertion process and a target pixel in an image obtained after the scaling-up process.

A second invention is such that, in the first invention, when the pixel value of the target pixel is the maximum or minimum value in a local region, the proximity-degree acquiring unit assumes that the pixel position of the target pixel is close to a pixel position at which a pixel of the original image is disposed when the original image is scaled up, and sets the estimated proximity degree of the target pixel larger than an estimated proximity degree obtained when the pixel value of the target pixel is neither the maximum value nor the minimum value in the local region.

In the resolution estimating device, the estimated proximity degree of a pixel having the maximum or minimum value in a local region (on an image) is set larger. Therefore, the estimated proximity degree may be adequately set. The estimated proximity degrees which are adequately set are used to detect the first-direction (for example, horizontal-direction) periodicity of proximity degree values with high accuracy, enabling the first-direction (for example, horizontal-direction) resolution of the original image (the image before the scaling-up process is performed) to be specified (estimated).

A third invention is such that, in the first invention, the estimated proximity degree of the target pixel is set in such a manner that, when the pixel value of the target pixel is the maximum or minimum value among three pixels which are continuous in the first direction on the image, the target pixel being located at the middle of the three pixels, the proximity-degree acquiring unit sets the estimated proximity degree of the target pixel to a first value, and, when the pixel value of the target pixel is neither the maximum value nor the minimum value among the three pixels which are continuous in the first direction on the image, the target pixel being located at the middle of the three pixels, the proximity-degree acquiring unit sets the estimated proximity degree of the target pixel to a second value smaller than the first value.

In the resolution estimating device, the proximity-degree acquiring unit sets the proximity degree value (proximity degree) of a pixel having the maximum or minimum value, larger in an input image. For pixels whose first-direction (for example, horizontal-direction) coordinates are identical, the accumulation unit accumulates the proximity degree values in the second direction (for example, the vertical direction). In the resolution estimating device, the frequency transform unit performs a frequency transform on a one-dimensional data sequence of the accumulated proximity degree values obtained by the accumulation unit, and obtains a data sequence for frequency regions. In the resolution estimating device, the spectrum analyzing unit analyzes the data sequence for frequency regions obtained by the frequency transform unit, thereby detecting the first-direction (for example, horizontal-direction) periodicity of the proximity degree values, and specifying (estimating) the first-direction (for example, horizontal-direction) resolution of the original image (the image before the scaling-up process is performed).

That is, in the resolution estimating device, proximity degree values, each of which represents positional closeness to a sampling position (a pixel position in an interpolation image), are accumulated in the second direction (for example, the vertical direction), whereby the number of proximity-degree value samples may be increased. Further, the periodicity of pixels having high proximity-degree values may be adequately detected from a data sequence for frequency regions which is obtained by performing a frequency transform on a time-series data sequence of the accumulated proximity-degree values.

That is, even when any scaling-up process is performed, the probability that a pixel located at a position closer to a sampling position (a pixel position in an interpolation image) has a larger proximity-degree value in a proximity-degree image (an image obtained by mapping proximity-degree values) is high. Therefore, in the resolution estimating device, this statistical property is used to increase the number of data samples as described above, whereby the first-direction (for example, horizontal-direction) periodicity of positions at which proximity-degree values are large may be correctly grasped with higher accuracy.

Thus, in the resolution estimating device, the resolution of the original image (original video) of any received image signal (video signal) may be adequately estimated.

A fourth invention is such that, in the first invention, the spectrum analyzing unit detects a frequency component value in the one-dimensional frequency-component data sequence, the frequency component value being a peak value, and estimates the resolution of the original image, which is an image before the scaling-up process, of the input image on the basis of the detected frequency component value.

Thus, the resolution estimating device may adequately estimate the resolution of the original image, which is an image before the scaling-up process, of an input image on the basis of frequency component values which are peak values in the one-dimensional data sequence of frequency components.

A fifth invention is such that, in the fourth invention, an estimated-resolution acquiring unit is further included.

When the spectrum analyzing unit detects peaks in the one-dimensional frequency-component data sequence, the peaks being located at different frequency component values, a frequency component value which is the minimum value among the frequency component values for data in which the peaks are detected is used as a minimum frequency component value, and a resolution corresponding to the minimum frequency component value is used as a first resolution. The estimated-resolution acquiring unit scales down a one-dimensional data sequence $S0(x)$ to a one-dimensional data sequence of the first resolution, the one-dimensional data sequence $S0(x)$ being obtained by accumulating pixel values of the input image in the second direction, and obtains a one-dimensional data sequence $S1(x)$ by scaling up the scaled-down one-dimensional data sequence of the first resolution in such a manner that the resolution of the scaled-up one-dimensional data sequence matches the resolution before the scaling-down process. The estimated-resolution acquiring unit calculates an error between the one-dimensional data sequence $S0(x)$ obtained from the input image and the one-dimensional data sequence $S1(x)$ obtained through the scaling-up process. The estimated-resolution acquiring unit estimates, as the resolution of the original image, which is an image before the scaling-up process, of the input image, the resolution corresponding to a frequency component value corresponding to one of the peaks detected in the one-dimensional frequency-component data sequence, on the basis of the calculated error.

In the resolution estimating device, the estimated-resolution acquiring unit scales down the one-dimensional data sequence $S0(x)$ obtained from an input image, to the minimum resolution among multiple estimated-resolution candidates obtained by the spectrum analyzing unit, and then obtains a one-dimensional data sequence $S1(x)$ obtained after the scaling-up process. Then, in the resolution estimating device, the estimated-resolution acquiring unit calculates an error between the one-dimensional data sequences $S0(x)$ and $S1(x)$, and specifies the most adequate estimated resolution among multiple estimated resolution candidates obtained by the spectrum analyzing unit, on the basis of the calculated error.

Therefore, the resolution estimating device may more adequately determine (estimate) the resolution of the original image (the image before the scaling-up process) of an input image.

A sixth invention is such that, in any one of the first to fifth inventions, the first direction is the horizontal direction on an image, and the second direction is the vertical direction on an image.

Thus, the resolution estimating device may perform processing by using the horizontal direction on an image as the first direction and by using the vertical direction on the image as the second direction, enabling the horizontal resolution of the original image (the image before the scaling-up process) of an input image to be adequately determined (estimated).

A seventh invention is such that, in any one of the first to fifth inventions, the first direction is the vertical direction on an image, and the second direction is the horizontal direction on an image.

Thus, the resolution estimating device may perform processing by using the horizontal direction on an image as the first direction and by using the vertical direction on the image as the second direction, enabling the vertical resolution of the original image (the image before the scaling-up process) of an input image to be adequately determined (estimated).

INDUSTRIAL APPLICABILITY

The present invention may achieve a resolution estimating device which may adequately estimate the resolution of the original image (original video) of any received image signal (video signal). Therefore, the present invention is useful in the video-related industry field, and may be embodied in this field.

REFERENCE SIGNS LIST 1000, 1000A, 1000B resolution estimating device
1, 1A proximity-degree acquiring unit
2, 2A accumulation unit
frequency transform unit
4, 4A spectrum analyzing unit
41 spectrum detecting unit
42, 42A estimated-resolution acquiring unit

The invention claimed is:
1. A resolution estimating device which estimates a resolution of an original image of an input image, the original image being an image before a scaling-up process, the device comprising:
  a proximity-degree acquiring circuit that sets an estimated proximity degree of each target pixel in such a manner that, as a pixel position of the target pixel is assumed to be closer to a pixel position at which a pixel in the original image is disposed when the original image is scaled up, the estimated proximity degree is set larger;
  an accumulation circuit that accumulates the estimated proximity degrees of the target pixels in a second direction orthogonal to a first direction on the image, and that obtains a one-dimensional data sequence of the accumulated estimated-proximity-degree values;
  a frequency transform circuit that performs a frequency transform on the one-dimensional data sequence of the accumulated estimated-proximity-degree values obtained by the accumulation circuit, and that obtains a one-dimensional frequency-component data sequence which is a one-dimensional data sequence for frequency regions;

a spectrum analyzing circuit that detects periodicity in the first direction on an image of the estimated proximity degrees on the basis of the one-dimensional frequency-component data sequence obtained by the frequency transform circuit, and that estimates the resolution of the original image of the input image on the basis of the detected periodicity, the original image being the image before the scaling-up process; and an image processing circuit that adjusts a scaling-up factor according to the resolution of the original image and processes the input image with respect to the scaling-up factor to generate an output image.

2. The resolution estimating device according to claim 1, wherein, when a pixel value of the target pixel is a maximum or minimum value in a local region, the proximity-degree acquiring circuit assumes that the pixel position of the target pixel is close to a pixel position at which a pixel of the original image is disposed when the original image is scaled up, and sets the estimated proximity degree of the target pixel larger than an estimated proximity degree obtained when the pixel value of the target pixel is neither the maximum value nor the minimum value in the local region.

3. The resolution estimating device according to claim 1, wherein the estimated proximity degree of the target pixel is set in such a manner that, when a pixel value of the target pixel is a maximum or minimum value among three pixels which are continuous in the first direction on the image, the target pixel being located at a middle of the three pixels, the proximity-degree acquiring circuit sets the estimated proximity degree of the target pixel to a first value, and, when the pixel value of the target pixel is neither the maximum value nor the minimum value among the three pixels which are continuous in the first direction on the image, the target pixel being located at the middle of the three pixels, the proximity-degree acquiring circuit sets the estimated proximity degree of the target pixel to a second value smaller than the first value.

4. The resolution estimating device according to claim 1, wherein the spectrum analyzing circuit detects a frequency component value in the one-dimensional frequency-component data sequence, the frequency component value being a peak value, and estimates the resolution of the original image of the input image on the basis of the detected frequency component value, the original image being the image before the scaling-up process.

5. The resolution estimating device according to claim 4, further comprising:

an estimated-resolution acquiring circuit, wherein, when the spectrum analyzing circuit detects peaks in the one-dimensional frequency-component data sequence, the peaks being located at different frequency component values, a frequency component value which is a minimum value among the frequency component values for data in which the peaks are detected is used as a minimum frequency component value, and a resolution corresponding to the minimum frequency component value is used as a first resolution, wherein the estimated-resolution acquiring circuit scales down a one-dimensional data sequence $S0(x)$ to a one-dimensional data sequence of the first resolution, the one-dimensional data sequence $S0(x)$ being obtained by accumulating pixel values of the input image in the second direction, and obtains a one-dimensional data sequence $S1(x)$ by scaling up the scaled-down one-dimensional data sequence of the first resolution in such a manner that a resolution of the scaled-up one-dimensional data sequence matches a resolution before the scaling-down process, wherein the estimated-resolution acquiring circuit calculates an error between the one-dimensional data sequence $S0(x)$ obtained from the input image and the one-dimensional data sequence $S1(x)$ obtained through the scaling-up process, and wherein the estimated-resolution acquiring circuit estimates, as the resolution of the original image of the input image, a resolution corresponding to a frequency component value corresponding to one of the peaks detected in the one-dimensional frequency-component data sequence, on the basis of the calculated error, the original image being the image before the scaling-up process.

6. The resolution estimating device according to claim 1, wherein the first direction is a horizontal direction on an image, and wherein the second direction is a vertical direction on an image.

7. The resolution estimating device according to claim 1, wherein the first direction is a vertical direction on an image, and wherein the second direction is a horizontal direction on an image.

* * * * *